(12) United States Patent
Nystad et al.

(10) Patent No.: US 7,920,139 B2
(45) Date of Patent: Apr. 5, 2011

(54) PROCESSING OF COMPUTER GRAPHICS

(75) Inventors: Jørn Nystad, Trondheim (NO); Mario Blazevic, Trondheim (NO); Borgar Ljosland, Trondheim (NO); Edvard Sørgård, Trondheim (NO)

(73) Assignee: Arm Norway AS, Trondheim (NO)

( * ) Notice: Subject to any disclaimer, the term of this patent is extended or adjusted under 35 U.S.C. 154(b) by 917 days.

(21) Appl. No.: 11/791,753

(22) PCT Filed: Nov. 29, 2005

(86) PCT No.: PCT/GB2005/004573
§ 371 (c)(1),
(2), (4) Date: May 29, 2007

(87) PCT Pub. No.: WO2006/056806
PCT Pub. Date: Jun. 1, 2006

(65) Prior Publication Data
US 2008/0012878 A1 Jan. 17, 2008

(30) Foreign Application Priority Data
Nov. 29, 2004 (GB) .................................. 0426170.7

(51) Int. Cl.
*G06T 15/00* (2006.01)
(52) U.S. Cl. ........ 345/419; 345/421; 345/422; 345/423; 345/581; 345/582; 345/583; 345/584; 345/611; 345/613
(58) Field of Classification Search .................. 345/419, 345/584, 611, 613, 421, 422, 423, 81, 582, 345/583
See application file for complete search history.

(56) References Cited

U.S. PATENT DOCUMENTS

| 5,929,862 | A | 7/1999 | Barkans |
| 6,057,855 | A | 5/2000 | Barkans |
| 6,128,000 | A | 10/2000 | Jouppi et al. |
| 6,424,343 | B1 | 7/2002 | Deering et al. |
| 6,424,345 | B1 | 7/2002 | Smith et al. |

(Continued)

FOREIGN PATENT DOCUMENTS
EP 0 910 047 4/1999
(Continued)

OTHER PUBLICATIONS

UK Search Report dated Jan. 30, 2009 for GB 0819570.3.
(Continued)

*Primary Examiner* — Kimbinh T Nguyen
(74) *Attorney, Agent, or Firm* — Nixon & Vanderhye P.C.

(57) ABSTRACT

A graphics processing platform includes a rasteriser 50 that receives primitives representing an image to be displayed for processing. The rasteriser 50 determines which sets of sampling points of the image include sampling points that are covered by a given primitive, and then generates a fragment for rendering for each set of sampling points found to include a sampling point that is covered by the primitive and passes those fragments to a renderer 51 for rendering. The renderer 51 carries out rendering operations on the fragments that it receives, and stores the rendered fragment data in tile buffers 52. The rendered fragment data is stored in multiple copies in the appropriate sample positions in the tile buffers 52, so as to provide a separate set of fragment data for each individual sample position taken of the image. The data from the tile buffers 52 is input to a downsampling unit 53, and thence output to a frame buffer 54 of a display device 55 for display.

38 Claims, 7 Drawing Sheets

U.S. PATENT DOCUMENTS

| | | | | |
|---|---|---|---|---|
| 6,633,297 B2* | 10/2003 | McCormack et al. | ......... | 345/506 |
| 6,697,063 B1* | 2/2004 | Zhu | ................ | 345/421 |
| 6,720,975 B1 | 4/2004 | Dietrich, Jr. | | |
| 6,766,410 B1 | 7/2004 | Carlton | | |
| 6,967,663 B1* | 11/2005 | Bastos et al. | .................. | 345/613 |
| 7,170,515 B1* | 1/2007 | Zhu | ................ | 345/422 |
| 7,184,041 B2* | 2/2007 | Heng et al. | .................... | 345/424 |
| 7,656,417 B2* | 2/2010 | Seiler et al. | .................... | 345/614 |
| 7,692,654 B1* | 4/2010 | Donham | ........................ | 345/441 |
| 2002/0130886 A1 | 9/2002 | Baldwin | | |
| 2002/0171658 A1 | 11/2002 | Ramani et al. | | |
| 2002/0180747 A1 | 12/2002 | Lavelle et al. | | |
| 2003/0117409 A1 | 6/2003 | Lefebvre et al. | | |
| 2003/0179199 A1 | 9/2003 | Deering et al. | | |
| 2005/0225670 A1 | 10/2005 | Wexler et al. | | |
| 2007/0229503 A1 | 10/2007 | Witzel et al. | | |

FOREIGN PATENT DOCUMENTS

| | | |
|---|---|---|
| EP | 0 910 047 | 7/2001 |
| GB | 2 368 763 | 5/2002 |
| GB | 2 444 598 | 6/2008 |
| WO | WO 99/45502 | 10/1999 |
| WO | WO 2005/091227 | 9/2005 |

OTHER PUBLICATIONS

P. Beaudoin et al, "Compressed Multisampling for Efficient Hardware Edge Antialiasing" *Proceedings of Graphics Interface*, May 2004, pp. 169-176.

U.S. Appl. No. 12/588,666, filed Oct. 22, 2009, Nystad et al.

UK Search and Examination Report dated Feb. 25, 2010 for GB 0918690.9.

Related U.S. Appl. No. 12/068,001, filed Jan. 31, 2008; Inventor: Nystad.

Related U.S. Appl. No. 12/068,007, filed Jan. 31, 2008; Inventor: Nystad et al.

Product review of ATI Radeon 9700 Pro Preview, Aug. 2002, www.firingsquad.com, 44 pages.

T. Akenine-Moller, "Flipquad: Low-Cost Multisampling Rasterization" Chalmers University of Technology Technical Report 02-04, Apr. 2002, pp. 1-4.

International Search Report for PCT/GB2005/004573 mailed Feb. 27, 2006.

International Search Report mailed Jun. 26, 2008 in European Application No. GB0801812.9.

* cited by examiner

Real geometry　　　　　　Rendered geometry

Supersample real geometry　　　　　　Rendered geometry

PROCESSING OF COMPUTER GRAPHICS

This application is the U.S. national phase of International Application No. PCT/GB2005/004573 filed 29 Nov. 2005 which designated the U.S. and claims priority to 0426170.7 filed 29 Nov. 2004, the entire contents of each of which are hereby incorporated by reference.

BACKGROUND OF THE INVENTION

1. Field of the Invention

The present invention relates to the processing of computer graphics, and in particular to a method of and an apparatus for carrying out anti-aliasing when processing computer graphics.

The present invention will be described with particular reference to the processing of three dimensional graphics, although as will be appreciated by those skilled in the art, it is equally applicable to the processing of two-dimensional graphics as well.

2. Discussion of Prior Art

One problem that is encountered when displaying computer generated images is that the displayed image is quantised into the discrete pixel locations of the display, e.g. monitor or printer, being used. This limits the resolution of the image that is displayed and can produce unwanted visual artifacts, for example, where the resolution of the output display device is not high enough to display smooth lines. These effects are commonly referred to as "aliasing".

FIG. 1 illustrates such aliasing effects. The lefthand side of FIG. 1 shows the image to be drawn, and the righthand side shows the actual image that is displayed. As can be seen, the desired smooth curve of the white object in fact has a jagged appearance on the display. This is aliasing. (In FIG. 1, each square represents a pixel of the display, and the crosses represent the points at each (x, y) pixel location for which the colour value for that pixel location is determined (sampled). For example, the pixel A in FIG. 1 is drawn as all white, because the colour sampling point for that pixel location falls within the white object. It should be noted that in FIG. 1 only sample crosses on the pixels of interest are shown, although in practice all pixels will be sampled.)

All aliasing artifacts could be removed by using a sufficiently high resolution display. However, the resolution of electronic displays and printers is typically limited, and so many graphics processing systems use other techniques to try to remove or reduce the effects of aliasing. Such techniques are typically referred to as anti-aliasing techniques.

One known anti-aliasing technique is referred to as supersampling or oversampling. In such an arrangement, plural colour samples are taken for each pixel location of the display, and then those plural samples are combined into a single colour when the pixel is displayed. This has the effect of smoothing or averaging the colour values from the original image at the pixel location in question.

FIG. 2 illustrates the supersampling process. In the example shown in FIG. 2, four colour values (sample points) are determined for each pixel in the display. (Each such sample can effectively be viewed as a "sub-pixel", with each pixel in the display being made up of four such sub-pixels.) The four colour value samples (sub-pixels) for a given pixel are then combined (downfiltered) such that the final colour that is used for the pixel in the display is an appropriate average (blend) of the colours of the four colour samples taken for the pixel.

This has the effect of smoothing the image that is displayed, and, e.g., reduces the prominence of aliasing artifacts by surrounding them with intermediate shades of colour. This can be seen in FIG. 2, where the pixel A now has two "white" samples and two "black" samples and so is set to 50% "white" in the displayed image. In this way, the pixels around the edges of the white object are blurred to produce a smoother edge, based on, e.g., how many samples are found to fall on each side of the edge.

Supersampling in effect processes the screen image at a much higher resolution than will actually be used for the display, and then scales and filters (down samples) the processed image to the final resolution before it is displayed. This has the effect of providing an improved image with reduced aliasing artifacts, but requires greater processing power and/or time, since the graphics processing system must in effect process as many pixels as there are samples (such that, e.g., for 4× supersampling (i.e. where 4 samples are taken for each pixel location), the processing requirements will be four times as great than if there was no supersampling).

Other anti-aliasing techniques have therefore been proposed that, while still providing some improvement in image quality, have less processing requirements than supersampling.

One common such technique is referred to as "multisampling". In multisampling, plural samples are again taken for each pixel that will make up the final display, but rather than determining a separate colour value for each sample, a single colour value is determined and applied to all the samples for a pixel that are found to belong to the same object in the final image. In other words multisampling calculates a single colour value for a given pixel for a given object in the scene, which colour value is applied to (reused for) all samples (subpixels) for the pixel that are covered by that object (in contrast to supersampling where a separate colour value is determined for each sample).

Because only a single colour value is used for multiple samples for a given pixel, multisampling is less processing intensive than supersampling and therefore can allow faster processing and performance than supersampling. However, there is a reduction in the quality of the displayed image as compared to supersampling, since although objects' edges are still sampled at a higher resolution, colours are not.

As is known in the art, 3D graphics processing is normally carried out by first splitting the scene to be displayed into a number of similar basic components (so-called "primitives") to allow the 3D graphics processing operations to be more easily carried out. These "primitives" are usually in the form of simple polygons, such as triangles, and are usually described by defining their vertices.

Once the scene to be displayed has been divided into a plurality of graphics primitives, the graphics primitives are usually then further divided, as is known in the art, into discrete graphical entities or elements, usually referred to as "fragments", on which the actual graphics processing operations (such as rendering operations) are carried out. Each such graphics fragment will represent and correspond to a given position in the primitive and comprise, in effect, a set of data (such as colour and depth values) for the position in question.

Each graphics fragment (data element) usually corresponds to a single pixel (picture element) in the final display (since as the pixels are the singularities in the final picture to be displayed, there will usually be a one-to-one mapping between the "fragments" the 3D graphics processor operates on and the pixels in the display). However, it can be the case that there is not a direct correspondence between "fragments" and "pixels", for example where particular forms of post-processing such as down-scaling are carried out on the rendered image prior to displaying the final image.

Thus two aspects of 3D graphics processing that are typically carried out are the "rasterising" of graphics "primitive" (or polygon) position data to graphics fragment position data (i.e. determining the (x, y) positions of the graphics fragments to be used to represent each primitive in the scene to be displayed), and then "rendering" the "rasterised" fragments (i.e. colouring, shading, etc., the fragments) for display on a display screen.

(In 3D graphics literature, the term "rasterisation" is sometimes used to mean both primitive conversion to fragments and rendering. However, herein "rasterisation" will be used to refer to converting primitive data to fragment addresses only.)

The rastering process basically involves determining for the sampling point (or the plural sampling points where supersampling or multisampling is being carried out) for each pixel in the display whether the primitive in question covers that sampling point (or sampling points). A fragment or fragments having the appropriate (x, y) position(s) are then generated for rendering the sampling point or points that are covered by the primitive.

The rendering process basically involves deriving the data necessary to display each fragment. Such data typically comprises red, green and blue (RGB) colour values for each fragment (which will basically determine the colour of the fragment on the display), and a so-called "Alpha" (transparency) value for each fragment.

As is known in the art, this data is typically derived by carrying out individual rendering processes (steps) on each fragment (i.e. the data for that fragment) one after another in a linear or pipelined fashion. Thus, for example, each fragment is firstly allocated initial RGB and alpha values, based on, e.g., the (x, y) position of the fragment, and the colour and transparency data recorded for the vertices of the primitive to which the fragment belongs. Operations such as texturing, fogging, and blending, etc., are then carried out on the fragment data in succession. These operations modify the initial RGB and alpha values set for each fragment, such that after the last processing operation, each fragment has an appropriate set of RGB and alpha values to allow that fragment to be displayed correctly on the display screen.

The final sets of RGB and alpha values to be used for display of the fragments are stored in a memory (commonly referred to as a frame buffer) as an array of fragment data that corresponds to the pixel array of the display. The data in the frame buffer is then used to set the pixels of the display when the image is to be displayed.

In many graphics rendering systems there will typically be an intermediate memory that stores the final fragment data and from which that data is transferred to the frame buffer for display. For example, in a deferred or tile-based rendering system, fragment data will first be stored in one or more tile buffers before being transferred to the frame buffer. Even in an immediate mode render there may be an intermediate buffer that receives and stores the rendered fragment data before it is transferred to the frame buffer.

Another important aspect of the rendering process (for 3D graphics rendering at least) is to determine whether a fragment for a given primitive will actually be seen when the final scene is displayed. This determination is typically carried out, as is known in the art, by using depth (Z) values that are set for each fragment in a primitive as it is rendered.

Thus as well as storing RGB and alpha values for each rendered fragment, a depth value is stored as well. Then, when a new fragment for a given (x, y) position is to be rendered, (e.g. because it belongs to a different primitive that covers the same sampling point), its depth value is compared with the depth value of the fragment currently stored for the relevant fragment position in the memory (e.g. frame or tile buffer) storing the final fragment values, to determine whether the new fragment will be seen instead of the currently stored fragment. If the new fragment will be seen, it is rendered and its final fragment data (colour value, etc.) is stored in place of the existing fragment data stored for the fragment position in question.

Thus at the end of the rendering process for a given scene to be displayed, fragment data comprising at least colour (and, e.g., depth) values will be stored across an array of fragment (x, y) positions, which data will then be used to colour the pixels of the display to display the scene.

In the simplest case, where there is a single sampling point for each pixel of the display, each stored fragment position will correspond to a single pixel having that position in the display (i.e. there will be a one-to-one mapping between the fragments and the pixels of the display), such that the fragment data stored for a fragment position will be used to set the pixel colour for the pixel having the corresponding position on the display device.

However, in the case of supersampling and multisampling, there will or may not be such a one-to-one mapping between the fragments and the pixels in the final display.

For example, in the case of supersampling, the rendering process will render and store a fragment with a complete set of fragment data (e.g. including at least colour and depth values in the case of 3D graphics processing) for each sample of the image that is taken. Thus, for example, for 4× supersampling, four fragments will be rendered for each pixel in the final display, and the fragment data for each of those fragments stored as separate fragment data. The fragment data for each set of four stored fragments will then be appropriately combined (downsampled) to give a data set (colour value) to be used for the relevant pixel of the display. Thus in such an arrangement, four sets of fragment data will be stored for each pixel in the final display.

In the case of multisampling, multiple samples are again taken for each pixel when the image is rasterised into fragments. However, all the samples for a given pixel that are covered by the primitive in question are rasterised to a single fragment (rather than as separate fragments as would be the case for supersampling). This single fragment is then rendered, thereby giving a single, common set of fragment data (e.g. depth value, colour value, etc.), for all the sampling points of the pixel covered by the primitive, which set of fragment data is then stored, as before.

While both supersampling and multisampling offer advantages in terms of reducing aliasing artifacts, the Applicants believe that there remains scope for improvement in known anti-aliasing techniques.

SUMMARY OF THE INVENTION

According to a first aspect of the present invention, there is provided a method of processing a graphics primitive of an image to be displayed, the method comprising:

determining for each sampling point of a plurality of sets of sampling points of the image to be displayed whether the graphics primitive covers the sampling point;

generating a set of graphics fragments for rendering the primitive, each graphics fragment corresponding to a set of sampling points found to include a sampling point that is covered by the primitive;

rendering graphics fragments generated for the primitive to determine a set of fragment data for each rendered graphics fragment; and storing in an array of fragment data a set of rendered fragment data for each sampling point of the sets of sampling points that correspond to the rendered graphics fragments found to be covered by the primitive.

According to a second aspect of the present invention, there is provided an apparatus for processing a graphics primitive of an image to be displayed, the apparatus comprising:

means for determining for each sampling point of a plurality of sets of sampling points of the image to be displayed whether the graphics primitive covers the sampling point;

means for generating a set of graphics fragments for rendering the primitive, each graphics fragment corresponding to a set of sampling points found to include a sampling point that is covered by the primitive;

means for rendering graphics fragments generated for the primitive to determine a set of fragment data for each rendered graphics fragment; and means for storing in an array of fragment data a set of rendered fragment data for each sampling point of the sets of sampling points that correspond to the rendered graphics fragments found to be covered by the primitive.

In the present invention, graphics fragments that are rendered each correspond to a set of sampling points of the original image, i.e. such that a given fragment can render the sampling points of the set of sampling points that the fragment corresponds to in common (i.e. together, in parallel at the same time). However, a set of the rendered fragment data is then stored for each sampling point that is covered by the primitive.

The Applicants have found that this arrangement has a number of advantages, as will be explained further below.

According to a third aspect of the present invention, there is provided a graphics rendering module, comprising:

a renderer that can render plural sampling points covered by a graphics primitive in common; and a memory buffer at the end of the renderer that stores a separate set of rendered fragment data for each sampling point covered by the primitive that is rendered by the renderer.

According to a fourth aspect of the present invention, there is provided a method of processing graphics for display, comprising:

rendering plural sampling points covered by a graphics primitive in common; and storing a separate set of rendered fragment data for each sampling point covered by the primitive that has been rendered in common.

The sets of sampling points taken of the image to be displayed (and that are accordingly associated with each fragment that is rendered) can be selected as desired. As is known in the art, each set of sampling points (and accordingly each sampling point) will represent a different location (x, y position) in the image to be displayed (although the relative positions of the sampling points in each set may (and typically will be) the same).

Where, as will typically be the case, the image is to be displayed on an output device having a display comprising a plurality of pixels, each set of sampling points preferably corresponds to a set of sampling points for a given pixel (pixel location) of the display, or to a set of sampling points for a part of a pixel (e.g. a sub-pixel) of the display. In the latter arrangement, a group of plural sets of sampling points preferably make up an overall set of sampling points for a pixel of the display. In these arrangements, each fragment will effectively render fragment data for a given pixel in the display.

The sets of sampling points could represent (cover) the entire area of the image that is to be displayed, or could, e.g., represent (and cover) only a part of the overall image to be displayed. The latter arrangement would be used in, for example, a tile-based rendering system where separate parts (tiles) of the image (such as 16×16 pixel tiles) are rendered in turn and then combined to display the final image. In this case, plural sets of sampling points representing the desired tile (part) of the image would be used to process the primitive, and the process would then be repeated, if necessary, for other tiles of the image.

The number of sampling points in each set of sampling points can be selected as desired. For example, each set of sampling points could in fact comprise a single sampling point. In this case, each fragment could, e.g. be arranged to correspond to a single pixel of the display, i.e. such that the rendering process will effectively be carried out without any supersampling or multisampling. This arrangement would therefore effectively process the image without any anti-aliasing.

In a particularly preferred embodiment, each set of sampling points includes plural sampling points (i.e. covers a plurality of sampling positions in the image). The actual number of sampling points can be selected as desired, although four is a preferred number.

Where each set of sampling points includes plural sampling points, the pattern and (relative) positions of the sample points (the sampling pattern) can also be selected as desired. For example, any known suitable anti-aliasing sampling pattern can be used, such as ordered grid supersampling. Most preferably a rotated grid supersampling pattern is used, as that provides a better sampling effect, as is known in the art. It is accordingly preferred for each sample point to have unique x and y coordinates in the image.

In one preferred embodiment, each set of sampling points used to sample the image for a given primitive is identical (i.e uses the same number and pattern and relative positions of sampling points). In this case the sets of sampling points will be the same for each fragment.

In another preferred embodiment, the sets of sampling points used to sample the image for a given primitive can differ and/or are different, e.g. in terms of the number of sampling points and/or the sampling pattern or relative positions used for each set of sampling points. Most preferably the sets of sampling points can differ as between fragments used to render a primitive.

In a particularly preferred embodiment, the sets of sampling points (e.g. to be associated with each fragment) can be selected and varied in use. This provides flexibility to the rendering and anti-aliasing process. Such selection of the sampling points could, e.g., be from a predetermined selection of sampling patterns, and/or the sampling pattern to use could be programmable in use. This would allow, for example, some fragments to be set to use an ordered grid sampling pattern and other fragments to be set to use a rotated grid sampling pattern.

In a particularly preferred embodiment of this type of arrangement, fragments are grouped into sets of plural fragments, and a different sampling pattern is used for each fragment in the set, but with the same sampling pattern being used for each respective fragment in each set of fragments. For example, a set of different sampling patterns may be applied to given groups of fragments (e.g. 2×2 arrays of fragments), but with the set of sampling patterns being repeatedly applied to each successive group of fragments.

This type of arrangement is particularly useful where a group of plural fragments will be downsampled to a single pixel in the output display, as it can be used, for example, to ensure that the sample points used for each fragment do not have matching x or y coordinates, i.e. such that each sample used for the pixel has unique x and y coordinates in the image.

In one preferred embodiment, each fragment that is used to render the primitive corresponds to a different set of sampling points. In such an arrangement, a single fragment only would in effect be generated and used to render in common the sampling points of each set of sampling points, i.e. such that the rendering process will effectively be carried out in a multisampled manner, with each fragment rendering the (plural) sampling points of a (different) set of sampling points in common.

In another preferred embodiment, more than one fragment is or can be generated and rendered for a given set of sampling points. This would allow more than one fragment to be used to render the set of sampling points, rather than a single fragment being used to render all the sampling points of the set of sampling points in common. Most preferably in such arrangements, each fragment that corresponds to the same set of sampling points is used to render data for different sampling positions of the set of sampling points.

This type of arrangement has the effect of increasing the number of different colour (texture) samples that will be generated for the set of sampling points that the plural fragments all correspond to (since a separate colour (texture) sample will be taken for each fragment that is rendered), and therefore allows the rendering process to operate in a manner more akin to supersampling. Thus, in a preferred embodiment, the system can selectively generate more than one fragment for rendering for a given set of sampling points.

In such arrangements, preferably one fragment is generated for each sampling point of the set of sampling points (or at least for each sampling point that is covered by the primitive), i.e. such that a separate fragment will be rendered for each different sampling point of the set of sampling points. In this case, the rendering process will effectively be carried out in a supersampled manner, as a set of fragment data (and thus a colour value (sample)) is generated separately (by rendering a different fragment) for each (covered) sampling point of the set of sampling points.

In these arrangements where plural fragments are generated for different sampling points of a set of sampling points, it is preferred for fragments only to be generated for sample points that are actually covered by the primitive, as that avoids the need to render fragments that will not actually be used for the primitive in question (since they would relate to sampling points that are not covered by the primitive). Thus, in these arrangements, one fragment is preferably generated for each sampling point of the set of sampling points that is covered by the primitive (but no fragments are generated for sampling points that are not covered by the primitive).

Thus, in a preferred embodiment, the system can and preferably does selectively generate plural fragments for a given set of sampling positions, most preferably based on the number of sampling positions in the set of sampling positions that are determined to be covered by the primitive in question (and preferably such that the same number of fragments are generated as there are sampling positions found to be covered). In a particularly preferred arrangement, the system of the present invention accordingly includes steps of or means for determining how many sampling points in a or each set of sampling points are covered by the primitive, and then generating a fragment for rendering for each sampling point in a given or each set of sampling points found to be covered by the primitive.

In a particularly preferred embodiment, the system of the present invention can be, preferably selectively, and preferably in use, configured either to only ever generate a single graphics fragment only for rendering for a set of sampling points that is to be rendered (e.g. found to include a sampling point that is covered by a primitive), or to be able to generate (if desired, e.g., because more than one sampling point in the set is covered) plural graphics fragments for rendering for a set of sampling points that is to be rendered (e.g. found to include a sampling point that is covered by a primitive). Preferably the system can be configured in this manner on an, e.g. per primitive, per drawing call and/or per scene basis. Most preferably the rendering state that the renderer is to be set to can be used to set which configuration the system operates in.

It is believed that these arrangements may be new and advantageous in their own right. Thus, according to a fifth aspect of the present invention, there is provided a method of processing a graphics primitive of an image to be displayed, the method comprising:

determining for each sampling point of a plurality of sets of sampling points of the image to be displayed whether the graphics primitive covers the sampling point;

selectively generating a single graphics fragment or a plurality of graphics fragments for rendering for each set of sampling points found to include a sampling point that is covered by the primitive;

rendering some or all of the graphics fragments generated for the primitive to determine a set of fragment data for each rendered graphics fragment; and storing some or all of the rendered fragment data in an array of fragment data.

According to a sixth aspect of the present invention, there is provided an apparatus for processing a graphics primitive of an image to be displayed, the apparatus comprising:

means for determining for each sampling point of a plurality of sets of sampling points of the image to be displayed whether the graphics primitive covers the sampling point;

means for selectively generating a single graphics fragment or a plurality of graphics fragments for rendering for each set of sampling points found to include a sampling point that is covered by the primitive;

means for rendering some or all of the graphics fragments generated for the primitive to determine a set of fragment data for each rendered graphics fragment; and means for storing some or all of the rendered fragment data in an array of fragment data.

According to a seventh aspect of the present invention, there is provided a method of operating a graphics rendering system in which the system can determine for each sampling point of a plurality of sets of sampling points of an image to be displayed whether a graphics primitive covers the sampling point, the method comprising:

configuring the graphics system to always generate a single graphics fragment only for rendering for a set of sampling points found to include a sampling point that is covered by a primitive; or configuring the graphics system to be able to generate plural graphics fragments for rendering for a set of sampling points found to include a sampling point that is covered by a primitive.

According to an eighth aspect of the present invention, there is provided a graphics rendering system, comprising:

means for determining for each sampling point of a plurality of sets of sampling points of an image to be displayed whether a graphics primitive covers the sampling point;

means for configuring the graphics system to always generate a single graphics fragment only for rendering for a set of sampling points found to include a sampling point that is covered by the primitive; and means for configuring the graphics processor to be able to generate plural graphics fragments for rendering for each set of sampling points found to include a sampling point that is covered by a primitive.

As will be appreciated by those skilled in the art, these aspects and embodiments of the invention can and preferably do include any one or more or all of the preferred and optional features of the invention described herein, as appropriate.

Thus, for example, the step of or means for selectively generating a single graphics fragment or a plurality of graphics fragments for rendering for each set of sampling points found to include a sampling point that is covered by the primitive preferably comprises steps of or means for determining how many sampling points of a set of sampling points the primitive covers, and, where the primitive covers only one sampling point of the set of sampling points, generating a single graphics fragment for rendering for the set of sampling points, but where the primitive covers more than one sampling point of the set of sampling points, generating plural graphics fragments for rendering for the set of sampling points.

The plural fragments for rendering for a given set of sampling points in these arrangements can be generated as desired. In a preferred embodiment each fragment to be rendered for the set of sampling points is arranged to have certain fragment data in common (i.e. data that is set, at least initially, to be the same for each fragment). This simplifies the generation of the fragments. Preferably (at least) any initial (e.g. pre-colour sampling) red, green and blue colour values, the alpha (transparency) value (if provided), and the Z (depth) value of each fragment is or are set to be the same. However, other fragment data, such as the (covered) sampling points to be associated with each fragment will and should naturally vary as between each fragment.

Thus, in a particularly preferred embodiment, where plural fragments are to be generated for a set of sampling points, a single fragment is still preferably first generated for the set of sampling points and then plural fragments having certain fragment data in common with (e.g. copied from) that initial fragment are generated (e.g. as many fragments as there are sampling points in the set that are covered), and then the plural fragments sent for rendering. In these arrangements, the plural new fragments are preferably generated and rendered in place of the initial fragment, but it would also be possible, e.g., to retain and render the initial fragment together with one or more additionally generated fragments (thereby to provide in total the plural fragments that are rendered).

Thus, in a preferred embodiment, a single fragment is first generated for a set of sampling points found to include a sampling point that is covered by the primitive, and then, if desired (e.g. the system is configured to operate in this way), it is determined whether the set of sampling points in fact includes more than one sampling point covered by the primitive, and, if it does, a new set of plural fragments for rendering is generated for the set of sampling points, which fragments preferably include at least some data in common with the single fragment initially generated for the set of sampling points.

It is again believed that these arrangements may be new and advantageous in their own right.

Thus, according to a ninth aspect of the present invention, there is provided a method of processing a graphics primitive of an image to be displayed, the method comprising:

determining for each sampling point of a plurality of sets of sampling points of the image to be displayed whether the graphics primitive covers the sampling point;

generating a graphics fragment for rendering for each set of sampling points found to include a sampling point that is covered by the primitive;

generating plural graphics fragments for those sets of sampling points found to include more than one sampling point that is covered by the primitive, the plural graphics fragments having at least some fragment data in common with the graphics fragment previously generated for the set of sampling points;

rendering graphics fragments generated for the primitive to determine a set of fragment data for each rendered graphics fragment; and storing some or all of the rendered fragment data in an array of fragment data.

According to a tenth aspect of the present invention, there is provided an apparatus for processing a graphics primitive of an image to be displayed, the apparatus comprising:

means for determining for each sampling point of a plurality of sets of sampling points of the image to be displayed whether the graphics primitive covers the sampling point;

means for generating a graphics fragment for rendering for each set of sampling points found to include a sampling point that is covered by the primitive;

means for generating plural graphics fragments for those sets of sampling points found to include more than one sampling point that is covered by the primitive, the plural graphics fragments having at least some fragment data in common with the graphics fragment previously generated for the set of sampling points;

means for rendering graphics fragments generated for the primitive to determine a set of fragment data for each rendered graphics fragment; and means for storing some or all of the rendered fragment data in an array of fragment data.

According to an eleventh aspect of the present invention, there is provided an apparatus for processing a graphics primitive of an image to be displayed, the apparatus comprising:

means for determining for each sampling point of a plurality of sets of sampling points of the image to be displayed whether the graphics primitive covers the sampling point;

means for generating a graphics fragment for rendering for each set of sampling points found to include a sampling point that is covered by the primitive;

means for selectively generating plural graphics fragments for sets of sampling points found to include more than one sampling point that is covered by the primitive;

means for rendering graphics fragments generated for the primitive to determine a set of fragment data for each rendered graphics fragment; and means for storing some or all of the rendered fragment data in an array of fragment data.

According to a twelfth aspect of the present invention, there is provided a graphics rendering module comprising:

a renderer that can render plural sampling points covered by a graphics primitive in common; and means for selectively rendering sampling points covered by a graphics primitive either in common or individually.

As will be appreciated by those skilled in the art, these aspects and embodiments of the invention can and preferably do include any one or more or all of the preferred and optional features of the invention described herein, as appropriate. Thus, for example, the plural graphics fragments that are generated for a set of sampling points found to include more than one sampling point that is covered by the primitive preferably comprise "newly" generated fragments (having data in common with the earlier fragment), but could instead be made up from the "original" fragment, together with one or more "newly" generated fragments. Similarly, where a set of sampling points is found to include only one covered sampling point, then the originally generated, single fragment, is preferably used as the single fragment for rendering that set of sampling points.

In a particularly preferred arrangement of these aspects and embodiments of the invention, the means for or step of selectively generating plural graphics fragments for rendering comprises means for or steps of receiving a graphics fragment that has been initially generated for a set of sampling points found to include a sampling point that is covered by a primitive, determining whether the set of sampling points that the fragment corresponds to includes more than one sampling point that is covered by the primitive, and, if it does, generating a set of plural fragments for rendering for the set of sampling points. Preferably, as discussed above, the set of plural fragments, if it is generated, comprises a set of new fragments, with each fragment in the set preferably having at least some fragment data in common with the initial fragment.

If it is determined that the set of sampling points that the initial fragment corresponds to includes only a single covered sampling point, then preferably the initial fragment is retained and sent for rendering, although, if desired, a new fragment corresponding to the initial fragment could instead be generated. On the other hand, if it is determined that the set of sampling points includes more than one covered sampling point, then preferably a set of plural fragments corresponding to the number of covered sampling points, with each fragment in the set corresponding to one covered sampling point, is generated and sent for rendering.

It is believed that such arrangements may be new and advantageous in their own right. Thus, according to a thirteenth aspect of the present invention, there is provided an apparatus for processing a graphics primitive of an image to be displayed, the apparatus comprising:

means for determining for each sampling point of a plurality of sets of sampling points of the image to be displayed whether the graphics primitive covers the sampling point;

means for generating a single graphics fragment for rendering for a set of sampling points found to include a sampling point that is covered by the primitive; and means for determining whether the set of sampling points found to include a sampling point that is covered by the primitive includes more than one sampling point covered by the primitive, and for, if it does, generating a set of plural fragments for rendering for the set of sampling points.

According to a fourteenth aspect of the present invention, there is provided a method of processing a graphics primitive of an image to be displayed, the method comprising:

determining for each sampling point of a plurality of sets of sampling points of the image to be displayed whether the graphics primitive covers the sampling point;

generating a single graphics fragment for rendering for a set of sampling points found to include a sampling point that is covered by the primitive; and determining whether the set of sampling points found to include a sampling point that is covered by the primitive includes more than one sampling point covered by the primitive, and, if it does, generating a set of plural fragments for rendering for the set of sampling points.

Again, these aspects of the invention can and preferably do include any one or more or all of the preferred and optional features of the invention described herein.

In a particularly preferred embodiment, the means for selectively generating plural graphics fragments for a set of sampling points can be selectively included in the rendering process or omitted from that process (bypassed), for example on a per primitive, per fragment, per drawing call, per tile, or per scene, etc., (or any combination of these) basis. This facilitates configuring the system to operate in this manner or not. Most preferably a functional arrangement or unit that carries out these functions and that can be selectively included in the rendering process (e.g. pipeline) or selectively bypassed in the rendering process (pipeline) is provided. This facilitates selectively omitting this function (e.g. by bypassing the functional unit), for example for a given fragment, primitive, drawing call, and/or scene, etc.

The set of graphics fragments that is generated for rendering the primitive should comprise sufficient fragments for rendering the primitive appropriately for display. Thus, for example, where it is known that a part of the primitive will not actually be seen in the final display, it would not be necessary to generate fragments for that part of the primitive. Equally, even if fragments have been generated for a primitive, it is preferred that any fragments that will not actually be seen in the final image are not rendered. Thus in a preferred embodiment, the present invention includes a step of or means for determining whether any given fragment may or will be seen in the final image (e.g., preferably, will be seen in place of a fragment whose data is already stored in the fragment array), and the fragment is only rendered if it is determined that it may or will be seen. Such a determination could be and preferably is based, in a 3D graphics system at least, on an assessment of depth values for the fragments, as is known in the art.

The fragment data that is determined and stored for each fragment and sampling point can be any suitable such data. It should at least include appropriate colour and/or transparency data, such as RGB and alpha values, to allow, e.g., a pixel of the display to be displayed appropriately. (It should be understood here that references herein to "colour data" include appropriate graycodes or similar data, such as would be used for a monochromatic or black and white display.)

In the case of processing three-dimensional graphics at least, the fragment data that is determined and stored preferably also includes a depth (Z) value for a fragment (and accordingly for the sample position or positions in question).

Other fragment data, such as so-called stencil data can also be (and preferably is) determined and stored, as appropriate (and if desired).

The rendered fragment data is stored in a fragment data array. As discussed above, a separate set of rendered fragment data is or can be stored in the fragment array for each sampling point that is covered by the primitive. This array should, as is known in the art, represent a two-dimensional array of, e.g., fragment positions, that can then be processed appropriately to, e.g., display a 2D array of pixels. As in the present invention a set of fragment data is stored for each sample position, the array of fragment data will correspond to an array of sample positions for the image to be displayed.

As will be appreciated by those skilled in the art, although the final array of fragment data will store a set of rendered fragment data for each sample position for subsequent display, it is not necessarily the case that all the rendered fragment data for a given primitive will be stored in the fragment data array. For example, if a fragment is rendered for a primitive but it is then determined (e.g. by using a depth comparison test, as is known in the art) that the primitive in question will not be seen at that fragment position (for example because fragment data of a primitive that occludes the rendered primitive is already stored in the fragment data array), then the data of the rendered fragment preferably is not and will not actually be stored in the fragment data array for the occluded sample position or positions. Thus, in practice, as is known in the art, rendered fragment data is preferably not stored in the fragment data array if after the fragment has been rendered, it is determined that the primitive to which the fragment relates will not in fact be seen at the relevant fragment position and/or sample positions. Thus, in practice, at least some, but not necessarily all, of the rendered fragment data for a given primitive will tend to be stored in the fragment data array, although over the entire set of primitives for the image, there will be a set of rendered fragment data stored for each position (e.g. sample position) in the fragment data array.

The sets of the fragment data that are stored in the fragment array can be stored in any appropriate manner. They are preferably, as will be appreciated by those skilled in the art, stored in positions in the fragment array corresponding to the sampling positions in the image that they represent, as that facilitates subsequent processing of the data for display.

It will be appreciated that although in many cases the primitive will cover all the sampling points of a set of sampling points that a fragment corresponds to, in some cases it may not, such that only some but not all of the sampling points associated with a fragment will be covered by the primitive. In the latter case, the rendered fragment data for the fragment will be used for those sampling points that are covered by the primitive, but not for those sampling points that are not covered by the primitive (since those sampling points will in practice be covered by another primitive of the image). There would therefore, e.g., be no need to store the rendered fragment data in the fragment data array for those sample positions that are not covered by the primitive.

Thus, in a preferred embodiment, the fragment data that is rendered for a fragment can be and preferably is selectively stored in the fragment data array (and in particular in the sample positions in the array corresponding to the set of sampling points that the fragment corresponds to). Such selective storing could comprise, e.g., only storing the rendered fragment data in the fragment data array for those sample points of the set of sampling points that a fragment corresponds to that are actually covered by the primitive (i.e. such that a separate set of the fragment data for a rendered fragment will be stored in the fragment data array for each covered sampling point of the set of sampling points that the fragment corresponds to, but the rendered fragment data will not be stored for the sample positions that are not covered by the primitive).

Alternatively or additionally, where, for example, plural fragments are rendered for each set of sample positions, the rendered fragment data for each of the plural fragments could be stored for a selected one or ones of the sampling points that the fragment corresponds to that are covered by the primitive (e.g. such that each of the plural fragments is used to generate rendered fragment data for a different one of the covered sampling points of the set of sampling points in question).

Thus, in a particularly preferred embodiment, each graphics fragment has associated with it data indicating which of the sampling points in the set of sampling points that the fragment corresponds to, the rendered fragment data should be stored for in the fragment data array (i.e. in effect, which of the sampling points in the set of sampling points that the fragment corresponds to, the fragment is being used to render). The system preferably then operates to store the rendered fragment data in the fragment data array for the individual, selected sample positions, but not for the remaining sample positions associated with the fragment.

The information indicating which sample points the fragment is being used to render is preferably associated with or part of the fragment data for the fragment that passes through the renderer (such as the RGB and alpha values for the fragment). It is preferably in the form of a coverage mask that indicates, for each sample position of the set of sample positions that is associated with the fragment, whether the fragment is being used to render that sample point (i.e. its data should be stored for that sample point).

This arrangement has been found to be a particularly convenient way of associating a given fragment with the appropriate sample points, and to facilitate other preferred operations of the present invention, such as those described above.

For example, the data indicating which sample points the fragment is being used to render can be used to determine how many copies of the rendered fragment data need to be stored in the fragment data array, and in which positions of the fragment data array that data should be stored.

This arrangement can also be used to facilitate the generation, as discussed above, of plural fragments for rendering for a given set of sampling points (e.g., when it is determined that the primitive covers more than one sampling point in a set of sampling points). In particular, when such a situation arises, and plural fragments are generated, the sample point data, e.g., coverage mask, associated with each fragment can be varied appropriately to indicate which sample point (or points) each of the fragments in fact relate to.

It is believed that these arrangements may be new and advantageous in their own right. Thus, according to a fifteenth aspect of the present invention, there is provided a method of processing a graphics primitive of an image to be displayed, comprising:

determining for each sampling point of a set of sampling points of the image to be displayed, whether the primitive covers that sampling point;

generating a set of graphics fragments for rendering the primitive, each graphics fragment corresponding to a set of sampling points found to include a sampling point that is covered by the primitive;

associating with each graphics fragment information indicating which of the sampling points in the set of sampling points that the fragment corresponds to are being rendered in common by the fragment;

rendering some or all of the graphics fragments to determine a set of fragment data for each rendered fragment; and storing, for one or more of the rendered fragments, a set of the rendered fragment data for a rendered fragment for each sampling point that the information associated with the fragment indicates was rendered in common by the fragment.

According to a sixteenth aspect of the present invention, there is provided an apparatus for processing a graphics primitive of an image to be displayed, comprising:

means for determining for each sampling point of a set of sampling points of the image to be displayed, whether the primitive covers that sampling point;

means for generating a set of graphics fragments for rendering the primitive, each graphics fragment corresponding to a set of sampling points found to include a sampling point that is covered by the primitive;

means for associating with each graphics fragment information indicating which of the sampling points in the set of sampling points that the fragment corresponds to are being rendered in common by the fragment;

means for rendering some or all of the graphics fragments to determine a set of fragment data for each rendered fragment; and means for storing for a rendered fragment a set of the rendered fragment data for the rendered fragment for each sampling point that the information associated with the fragment indicates was rendered in common by the fragment.

As will be appreciated by those skilled in the art, as each fragment is rendered, it will undergo appropriate colouring and/or texturing operations. Thus it will be necessary to determine an appropriate colour sample or samples from the image to allow each fragment to be rendered appropriately. This colour sampling can be carried out in any suitable manner.

In a particularly preferred embodiment, the colour sampling is carried out on a per fragment basis, as each fragment is rendered. This may be and preferably is carried out as part of the texture "look-up" for the fragment when the fragment reaches the texture mapping stage of the rendering process. (As is known in the art, when a graphics fragment is rendered, there will typically be a stage in that process, known as texture mapping, where the colour and texture to use for the fragment will be determined and set, based on, e.g., texture coordinates (s, t) that have been set for the fragment in question.) In such an arrangement, each fragment will effectively provide a single colour (texture) look-up for the set of sampling points that it corresponds to, i.e. such that the individual fragment can be considered to operate in a multisampled manner (i.e. with a single colour (texture) look-up for the (plural) sampling positions associated with the fragment).

The colour sample (e.g. texture look-up) that is used for each fragment is preferably taken from a single position within the image in question. This sample position could, e.g., correspond to one of the position samples that are taken to determine the coverage of the primitive, or, e.g., be taken at the centre of the position sampling pattern (e.g. pixel) in question.

Most preferably, the colour sample is taken from an appropriately weighted or selected position in the area covered by the sampling pattern (e.g. pixel, where each sampling pattern corresponds to a pixel). Where such "weighting" of the colour sampling position is used, the weighted (selected) position is preferably based on the positions of the (covered) sampling points that the fragment is being used to render.

Thus, in a particularly preferred embodiment, the colour sample position is determined in accordance with the covered sampling points that the fragment in question is being used to render. Thus, for example, if all the sampling points in the set of sampling points are covered by the primitive, and a single fragment is being used to render those sampling points in common, the colour sample is preferably taken from the centre of the sampling pattern. Similarly, if the fragment represents only a single covered sampling point, then the colour sample is preferably taken at that sampling point position. If the fragment represents two covered sampling points, then the colour sample is preferably taken from an appropriate position relative to those samples (e.g. weighted towards the locations of those two samples) and so on.

The colour sample positions to be used could, e.g., be calculated in use based on the covered sample points associated with each fragment, and/or the colour sample position to use for each given sample point coverage pattern could be predetermined and then the set of predetermined colour sample positions stored (e.g. with an appropriate identifier for the coverage pattern that they correspond to), e.g. in a look-up table, to allow the renderer to retrieve the appropriate colour sample position for a fragment in use.

In a preferred embodiment, the rendering process, etc., is pre-configured to use a given sampling pattern (and colour sample position (or set of positions)) and then apply that pattern, etc., to all the fragments as they are rendered. This facilitates the rendering process generating the fragment data and then storing that data in the appropriate positions in the fragment data array.

In an alternative arrangement, each fragment could have associated with it data indicating the sampling pattern used for the fragment and/or the colour sample position to be used for the fragment.

It will be appreciated that with the above arrangements, the present invention can effectively be operated in a number of anti-aliasing modes, such as multisampling, supersampling or with no anti-aliasing enabled.

For example, if each fragment is used to render plural sample points in common, the image will effectively be processed in a multisampled manner. On the other hand, if only a single sampling point is set for each set of sampling points (e.g., pixel), the graphics processing can effectively be carried out in a non-multisampled manner, i.e. without anti-aliasing. Equally, by generating an additional fragment for each sample point over one found to be covered by the primitive for each set of sampling points, the system can effectively be operated in a supersampled manner.

Thus, in a particularly preferred embodiment, one or more and preferably all of the above sampling and/or anti-aliasing options, such as the number of sampling points or the sampling pattern to use, and whether to generate additional fragments where more than one sampling point for a set of sampling points is covered by the primitive, can be selectively enabled or disabled in use. Thus, the method or apparatus of the present invention preferably further includes means for or a step of selecting or setting the sampling mode and/or anti-aliasing mode to be used (and, e.g., for configuring the renderer appropriately). Most preferably the sampling and/or anti-aliasing mode can be selected and set on a primitive by primitive basis (i.e. for an individual primitive or for a set of primitives).

Indeed, a particular advantage of the graphics processing arrangement of the present invention is that it allows flexibility in the anti-aliasing and sampling techniques that can be used, and, furthermore, can allow the anti-aliasing and/or sampling mode to be selected and changeable in use.

Thus, according to a seventeenth aspect of the present invention, there is provided a graphics rendering module comprising:

means for configuring the rendering module to render graphics primitives for display using a plurality of different anti-aliasing and/or sampling modes.

According to an eighteenth aspect of the present invention, there is provided a graphics rendering module comprising:

means for selectively varying the sampling mode and/or anti-aliasing mode to be used for rendering graphics primitives for display.

According to a nineteenth aspect of the present invention, there is provided a graphics rendering module that can be configured to use different sampling and/or anti-aliasing modes for rendering graphics primitives, and comprises:

means for rendering different graphics primitives for display using different anti-aliasing and/or sampling modes.

According to a twentieth aspect of the present invention, there is provided a graphics rendering module, in which graphics primitives for display can be rendered in a plurality of different anti-aliasing and/or sampling modes, the rendering module comprising:

means for determining the anti-aliasing and/or sampling mode to be used when rendering a primitive.

According to a twenty-first aspect of the present invention, there is provided a method of operating a graphics rendering module, in which graphics primitives for display can be rendered in a plurality of different anti-aliasing and/or sampling modes, the method comprising:

determining the anti-aliasing and/or sampling mode to be used when rendering a primitive; and rendering the graphics primitive using the determined anti-aliasing and/or sampling mode.

In these aspects and arrangements of the invention, graphics primitives can preferably be rendered as discussed above, in a multisampled manner, or in a supersampled manner, or with no anti-aliasing enabled.

Which anti-aliasing mode is used for which primitive can be selected as desired. For example, supersampling is particularly useful for so-called "alpha" textures and "alpha punch-through" textures in 3D graphics processing. (This is because in such textures, as is known in the art, transparent and opaque parts will meet, which can lead to aliasing artefacts, even in multisampled arrangements. Supersampling, however, can help to alleviate such aliasing.) However, for other textures, supersampling may not be so necessary. Thus in a preferred embodiment, the rendering process is set to perform "supersampling" for alpha texture primitives but to perform multisampling for all other primitives.

The anti-aliasing and/or sampling mode can be set in use in any suitable manner. In a preferred embodiment a given primitive or primitives can be associated with a particular anti-aliasing and/or sampling mode.

Most preferably the anti-aliasing and/or sampling mode to use is defined as part of the rendering state that is defined for the primitive or primitives.

As is known in the art, in order to be able to carry out the correct rendering operation, each stage of the rendering process needs to be configured appropriately, i.e. to be set to the correct so-called "rendering state". The rendering state determines how the stages of the rendering process operate on each fragment, and typically determines, for example, one or more of the blending mode, stencil buffer operation, texture function, texture map information, z-test mode, RGBa buffer write mode, etc., to be used for rendering the graphics fragments. It can also be used to, e.g., indicate the rasterising mode to be used. In the present embodiment, it will also be used to set the anti-aliasing and/or sampling mode for the primitive or primitives in question.

Where a primitive having a given anti-aliasing and/or sampling mode is to be rendered, then all the stages of the rendering process could first be configured to the desired anti-aliasing and/or sampling state, and then the graphics fragments issued for rendering (in a similar way to the way that the entire renderer would be configured to a single rendering state before graphics fragments are sent to it in many graphics processing systems).

However, in a particularly preferred embodiment, the graphics fragments to be rendered are associated with their desired anti-aliasing and/or sampling mode, and rendering units of the renderer then use that association to determine the anti-aliasing and/or sampling mode that they should use for rendering the fragments when they receive the fragments. In other words, when a rendering unit receives a fragment for rendering, it determines the sampling and/or anti-aliasing mode to use for the fragment based on the sampling and/or anti-aliasing mode that has been associated with the fragment, and then renders the fragment accordingly. This avoids the need to configure the entire renderer to a given sampling or anti-aliasing mode before any fragments are rendered. It also means that the rendering units of the renderer can effectively each configure themselves to the sampling or anti-aliasing mode required for their current fragment independently of the current sampling or anti-aliasing mode or modes of the remaining rendering units in the renderer.

Thus, according to a twenty-second aspect of the present invention, there is provided a graphics processor, comprising:

a renderer for rendering graphics fragments for display and that comprises more or more rendering units that can be configured to different sampling and/or anti-aliasing modes;

means for associating a graphics fragment to be rendered with one of the possible sampling and/or anti-aliasing modes; and means for issuing graphics fragments that have been associated with a sampling and/or anti-aliasing mode to the rendering units of the renderer for rendering;

wherein:

one or more of the rendering units of the renderer comprise:

means for determining the sampling and/or anti-aliasing mode associated with a graphics fragment to be rendered; and means for configuring the rendering unit in accordance with the determined sampling and/or anti-aliasing mode.

According to a twenty-third aspect of the present invention, there is provided a method of operating a graphics processor having a renderer including one or more rendering units for rendering graphics fragments for display, the method comprising:

associating each fragment to be rendered with a sampling and/or anti-aliasing mode to be used for rendering the fragment; and a rendering unit, when it receives a fragment to be rendered, determining the sampling and/or anti-aliasing mode associated with that fragment, being configured in accordance with the determined sampling and/or anti-aliasing mode, and carrying out its rendering operation on the received fragment.

The graphics fragments can be associated with a given anti-aliasing and/or sampling mode in any suitable manner. Most preferably each fragment is allocated a flag or index pointer that is "passed" through the renderer with the fragment and that indicates the anti-aliasing and/or sampling mode to be used for that fragment. The rendering units can then use the sampling and/or anti-aliasing flag or pointer of the fragment to determine the appropriate sampling and/or anti-aliasing mode for the fragment (e.g. to retrieve the appropriate sampling and/or anti-aliasing data from a memory storing that data). The sampling and/or anti-aliasing flag or pointer is preferably associated with the other data for the fragment (such as its RGBa values) that "passes" through the renderer.

The flag or pointer could identify the actual anti-aliasing and/or sampling mode to be used, but in a preferred embodiment, as will be discussed further below, does not do this but instead simply indicates (points to) the memory location where the relevant data set is stored. This reduces the complexity of the flag or pointer, as it would not then need potentially to distinguish between all the possible sampling and/or anti-aliasing modes that could be used.

In a particularly preferred such embodiment, primitives to be rendered are associated with (and flagged with) the anti-aliasing and/or sampling mode to be used for rendering that primitive (since, typically, a given primitive will be rendered in its entirety using the same, single anti-aliasing and/or sampling mode) and then, when the primitive is rasterised into fragments, each fragment is allocated the anti-aliasing and/or sampling mode pointer or flag allocated to the primitive. Thus, preferably, the rasterising of the primitive into fragments is used to associate the fragments with their corresponding anti-aliasing and/or sampling modes.

As is known in the art, the stored array of fragment data will need to be further processed for display on the output device, and in particular, it will typically be necessary to "downsample" the stored fragment data to an appropriate final output set of discrete data values, such as pixel data for a pixel array of a display. This downsampling can be performed in any appropriate manner, such as by using scaling and downfiltering techniques used in existing supersampling or multisampling methods. Thus the downsampling (combining of the stored fragment data into fewer data values) preferably takes place in a "write back" process, when the data stored in the fragment array is "written back" to a frame buffer of the display ready for its display.

In a particularly preferred embodiment, the level of downsampling applied to the fragment data can be selected in use. Most preferably two successive downsampling stages are provided, of which one or both can be activated. Each downsampling stage preferably downsamples its input data by the same amount.

The actual level of downsampling that is applied can be selected as desired. However, where, for example, four position sample points are used per pixel, then each successive downsampling stage preferably downsamples by a factor of four. This would provide either 4× downsampling (if one stage only is activated) or 16× downsampling (4× downsampling followed by a further 4× downsampling) if both stages are activated.

This ability to vary the amount that the data is downsampled for display further enhances flexibility of the sampling and anti-aliasing process, since it allows, for example, edges and colours to be sampled at different rates (depending on, e.g. whether the fragment rendering is carried out in a multisampled or a supersampled manner).

The level of downsampling can preferably be set and selected on a frame-by-frame basis (as it will usually be the data for individual frames of the image that is downsampled, as is known in the art). Where two successive levels of downsampling are provided, most preferably, one level of downsampling is always activated, and the second level of downsampling can be selectively applied, preferably by using a register that is set per frame.

It is believed that such arrangements may be new and advantageous in their own right. Thus, according to a twenty-fourth aspect of the present invention, there is provided a method of processing an image for display on a display device comprising a plurality of pixels, the method comprising:

rendering graphics fragments representing the image to generate fragment data for the fragments;

storing an array of the rendered fragment data;

downsampling the stored fragment data to provide an array of pixel data for displaying the image on the display device; wherein:

the level of downsampling can be varied, and the method further comprises:

selecting the level of downsampling to be used on the rendered fragment data.

According to a twenty-fifth aspect of the present invention, there is provided an apparatus for processing an image for display on a display device comprising a plurality of pixels, the apparatus comprising:

means for rendering graphics fragments representing the image to generate fragment data for the fragments;

means for storing an array of the rendered fragment data;

means for downsampling the stored fragment data to provide an array of pixel data for displaying the image on the display device; wherein:

the level of downsampling can be varied, and the apparatus further comprises:

means for selecting the level of downsampling to be used on the rendered fragment data.

The downsampled data (that is, e.g., written to the frame buffer), is also preferably gamma-corrected, e.g. before it is written to the frame buffer. (As is known in the art, the graphics colour data for an image to be displayed will normally need to be modified for it to display the image properly on a display screen in view of the, e.g. brightness etc., characteristics of the display screen. The process of correcting the generated data to account for this is known as gamma-correction). This gamma-correction can be carried out in any suitable manner known in the art.

Although the present invention has been described primarily with reference to the processing of a single graphics primitive, as will be appreciated by those skilled in the art, an image to be displayed will typically be made up of plural primitives and so in practice the method of the present invention will be repeated for each primitive making up the display, so that eventually an appropriate set of fragment data has been generated for each sampling point of the image that is needed to display the entire image (or relevant part of the image, e.g., in a tile-based rendering system), which data can then be downsampled for display.

In the case of 3D graphics processing at least, it may also be necessary to determine whether the primitive will actually be seen at each sample point (where, e.g., primitives overlap).

Thus, according to a twenty-sixth aspect of the present invention, there is provided a method of processing a graphics primitive of an image to be displayed, the method comprising:

determining for each sampling point of a plurality of sets of sampling points of the image to be displayed whether the graphics primitive covers the sampling point;

generating a set of graphics fragments for rendering the primitive, each graphics fragment corresponding to a set of sampling points found to include a sampling point that is covered by the primitive;

determining whether each generated graphics fragment may or will be seen in the displayed image;

rendering graphics fragments generated for the primitive that it is determined may or will be seen in the displayed image to determine a set of fragment data for each such graphics fragment; and storing in an array of fragment data a set of rendered fragment data for each sampling point of the sets of sampling points that correspond to the rendered graphics fragments found to be covered by the primitive.

According to a twenty-seventh aspect of the present invention, there is provided an apparatus for processing a graphics primitive of an image to be displayed, the apparatus comprising:

means for determining for each sampling point of a plurality of sets of sampling points of the image to be displayed whether the graphics primitive covers the sampling point;

means for generating a set of graphics fragments for rendering the primitive, each graphics fragment corresponding to a set of sampling points found to include a sampling point that is covered by the primitive;

means for determining whether each generated graphics fragment may or will be seen in the displayed image;

means for rendering the graphics fragments generated for the primitive that it is determined may or will be seen in the displayed image to determine a set of fragment data for each such graphics fragment; and means for storing in an array of fragment data a set of rendered fragment data for each sampling point of the sets of sampling points that correspond to the rendered graphics fragments found to be covered by the primitive.

In these aspects and embodiments of the invention, the determination of whether a graphics fragment will or may be seen in the displayed image preferably comprises carrying out appropriate depth testing, as is known in the art, to determine whether the primitive (fragment) will actually be seen at the location in question. Thus in a particularly preferred such embodiment, when a fragment for a given sample position in the fragment array is to be rendered, its depth value is preferably compared with the depth value of any fragment data for that sample position that is already stored in the fragment array, and the new fragment only rendered (and its data stored in the fragment array) if the depth value comparison indicates that the new fragment will be seen in place of the existing stored fragment.

According to a twenty-eighth aspect of the present invention, there is provided a method of processing an image for display, in which the image to be displayed is divided into one or more graphics primitives for processing and fragment data for use to display the image is generated and stored as an array of fragment data corresponding to an array of sample positions of the image, the method comprising:

generating a set of one or more than one graphics fragments for rendering each primitive of the image, each fragment corresponding to a set of sampling points of the image and being used to render in common one or more than one sampling point that is covered by the primitive of the set of sampling points;

rendering some or all of the generated graphics fragments to generate a set of rendered fragment data for each rendered fragment; and storing in the array of fragment data, for some or all of the rendered fragments, a copy of the rendered fragment data for the rendered fragment at the position or positions in the array of fragment data that correspond to the sample position or positions that the fragment rendered in common.

According to a twenty-ninth aspect of the present invention, there is provided an apparatus for processing an image comprising one or more graphics primitives for display, comprising:

means for storing an array of fragment data corresponding to an array of sample positions of the image;

means for generating a set of one or more than one graphics fragments for rendering each primitive of the image, each fragment corresponding to a set of sampling points of the image and being used to render in common one or more than one sampling point that is covered by the primitive of the set of sampling points;

means for rendering some or all of the generated graphics fragments to generate a set of rendered fragment data for each rendered fragment; and means for storing in the array of fragment data, a copy of the rendered fragment data for a rendered fragment at the position or positions in the array of fragment data that correspond to the sample position or positions that the fragment rendered in common.

As will be appreciated from the above, these aspects of the invention can and preferably do include one or more or all of the preferred and optional features of the invention described herein. Thus, for example, where appropriate the depth value of a new fragment (from a new primitive) to be rendered is preferably compared with the depth value of the fragment (if any) that is already stored for the sample position in question to determine whether the new fragment should be rendered. Similarly, the stored array of rendered fragment data is preferably downsampled to provide the, e.g. pixel data, that is used to display the final image.

It will be appreciated from the above that in operation of the present invention, plural samples of the image (or a part of the image) to be displayed are taken, and a separate set of fragment data is stored for each sample of the image. However, although a separate set of data is stored for each sample, samples can be (and preferably are) rendered in common.

Thus, according to a thirtieth aspect of the present invention, there is provided a method of processing an image for display, comprising:

taking plural samples of all or a part of the image to be displayed;

rendering the samples to generate rendered sample data, wherein at least two of the samples are rendered in common; and storing a set of rendered sample data for each of the samples taken of the image or part of the image.

According to a thirty-first aspect of the present invention, there is provided an apparatus for processing an image for display, comprising:

means for taking plural samples of all or a part of the image to be displayed;

means for rendering the samples to generate rendered sample data; and means for storing a set of rendered sample data for each of the samples taken of the image or part of the image; wherein the means for rendering the samples includes means for rendering samples of the image in common.

According to a thirty-second aspect of the present invention, there is provided a method of processing a graphics primitive of an image to be displayed, the method comprising:

determining for each sampling point of a plurality of sets of sampling points of the image to be displayed whether the graphics primitive covers the sampling point;

generating one or more graphics fragments for rendering for each set of sampling points found to include a sampling point that is covered by the primitive, each graphics fragment corresponding to one or more than one sampling point of the set of sampling points that is covered by the primitive;

rendering one or more of the graphics fragments generated for the primitive to determine a set of fragment data for each rendered graphics fragment; and storing in an array of fragment data for one or more of the rendered graphics fragments a copy of the rendered fragment data for a rendered fragment for each covered sampling point that the fragment corresponds to.

According to a thirty-third aspect of the present invention, there is provided an apparatus for processing a graphics primitive of an image to be displayed, the apparatus comprising:

means for determining for each sampling point of a plurality of sets of sampling points of the image to be displayed whether the graphics primitive covers the sampling point;

means for generating one or more graphics fragments for rendering for each set of sampling points found to include a sampling point that is covered by the primitive, each graphics fragment corresponding to one or more than one sampling point of the set of sampling points that is covered by the primitive;

means for rendering graphics fragments generated for the primitive to determine a set of fragment data for each rendered graphics fragment; and means for storing in an array of fragment data a copy of the rendered fragment data for a rendered fragment for each covered sampling point that the fragment corresponds to.

In a particularly preferred embodiment, the various functions of the present invention are carried out on a single graphics processing platform that generates and outputs the data that is written to the frame buffer for the display device. Thus, in particular, it is preferred for the downsampling of the stored fragment data to "pixel data" to be performed on the graphics processing platform prior to that data being exported to the frame buffer for the display device, as that reduces the volume of data that must be exported from the graphics platform.

Indeed, it is believed that the provision of a graphics processing arrangement in which all the graphics processing, including any post-rendering downsampling, is carried out on a graphics processing platform, prior to the data being exported to a separate, external frame buffer (i.e. that is not on the graphics processing platform) of a display device for display is particularly advantageous, and, moreover, may be new and advantageous in its own right.

Thus, according to a thirty-fourth aspect of the present invention, there is provided a method of processing graphics for display, comprising:

rendering on a graphics processing platform one or more graphics fragments to generate rendered fragment data for display;

downsampling, on the graphics processing platform, the rendered fragment data; and exporting the downsampled fragment data from the graphics processing platform to a frame buffer for display.

According to a thirty-fifth aspect of the present invention, there is provided a graphics processing platform, comprising:

means for rendering one or more graphics fragments to generate rendered fragment data for display;

means for downsampling the rendered fragment data; and means for exporting the downsampled fragment data to a frame buffer for display.

As will be appreciated by those skilled in the art, these aspects and embodiments of the invention can, and preferably do, include one or more or all of the preferred and optional features of the invention described herein, as appropriate. Thus, for example, the rendered fragment data is preferably stored in an intermediate buffer or buffers, such as (and preferably) a tile buffer or buffers, on the graphics processing platform prior to being downsampled (and prior to being exported to the (remote) frame buffer).

The present invention is applicable to any form or configuration of renderer, such as renderers having a "pipelined" arrangement (in which case the renderer will be in the form of a rendering pipeline). It is applicable to all forms of rendering, such as immediate mode rendering, deferred mode rendering, tile-based rendering, etc., although it is particularly applicable to graphics renderers that use deferred mode rendering and in particular to tile-based renderers.

As will be appreciated from the above, the present invention is particularly, although not exclusively, applicable to 3D graphics processors and processing devices, and accordingly extends to a 3D graphics processor and a 3D graphics processing platform including the apparatus of or operated in accordance with any one or more of the aspects of the invention described herein. Subject to any hardware necessary to carry out the specific functions discussed above, such a 3D graphics processor can otherwise include any one or more or all of the usual functional units, etc., that 3D graphics processors include.

It will also be appreciated by those skilled in the art that all of the described aspects and embodiments of the present invention can, and preferably do, include, as appropriate, any one or more or all of the preferred and optional features described herein.

The methods in accordance with the present invention may be implemented at least partially using software e.g. computer programs. It will thus be seen that when viewed from further aspects the present invention provides computer software specifically adapted to carry out the methods herein described when installed on data processing means, a computer program element comprising computer software code portions for performing the methods herein described when the program element is run on data processing means, and a computer program comprising code means adapted to perform all the steps of a method or of the methods herein described when the program is run on a data processing system. The invention also extends to a computer software carrier comprising such software which when used to operate a graphics processor, renderer or microprocessor system comprising data processing means causes in conjunction with said data processing means said processor, renderer or system to carry out the steps of the methods of the present invention. Such a computer software carrier could be a physical storage medium such as a ROM chip, CD ROM or disk, or could be a signal such as an electronic signal over wires, an optical signal or a radio signal such as to a satellite or the like.

It will further be appreciated that not all steps of the methods of the invention need be carried out by computer software and thus from a further broad aspect the present invention provides computer software and such software installed on a computer software carrier for carrying out at least one of the steps of the methods set out herein.

The present invention may accordingly suitably be embodied as a computer program product for use with a computer system. Such an implementation may comprise a series of computer readable instructions either fixed on a tangible medium, such as a computer readable medium, for example, diskette, CD-ROM, ROM, or hard disk, or transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

BRIEF DESCRIPTION OF THE DRAWINGS

A number of preferred embodiments of the present invention will be described by way of example only and with reference to the accompanying drawings, in which.

DETAILED DISCUSSION OF EMBODIMENTS

A preferred embodiment of the present invention will now be described in the context of processing of 3D graphics for display. However, as will be appreciated by those skilled in the art, the present invention is not limited to the processing of 3D graphics and has other application as well.

As is known in the art, and as discussed above, when a 3D graphics image is to be displayed, it is usually first defined as a series of primitives (polygons), which primitives are then divided (rasterised) into graphics fragments for graphics rendering in turn. During a normal 3D graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output for display.

The present invention is particularly concerned with facilitating anti-aliasing operations when displaying graphics images. As is known in the art, anti-aliasing is carried out by taking plural samples of an image to be displayed and then downsampling those samples to the output resolution of the display.

Figure 1:
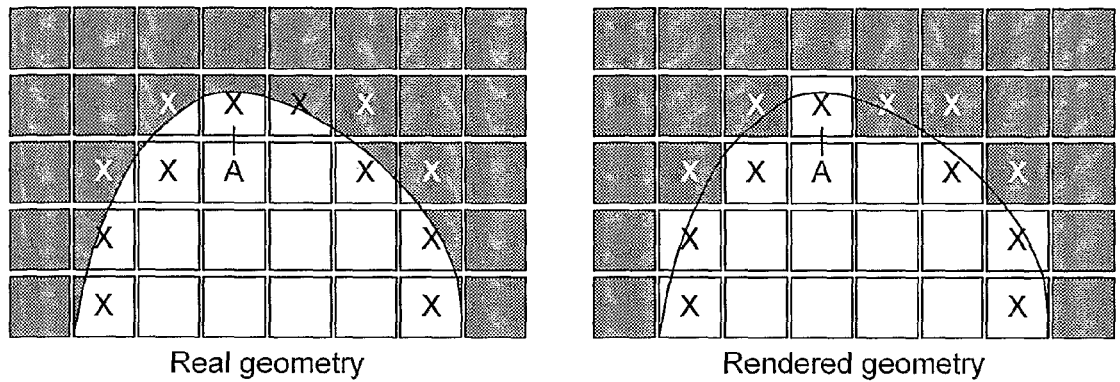
FIG. 1 shows schematically the effect of aliasing.
Figure 2:
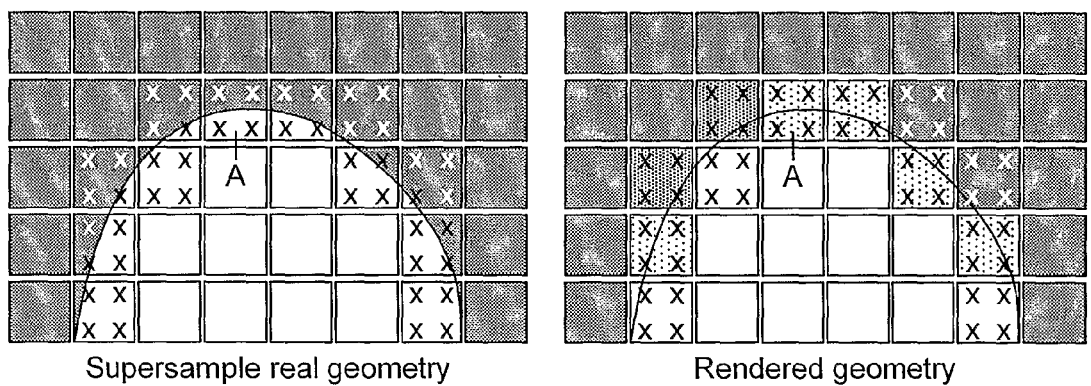
FIG. 2 shows schematically the supersampling anti-aliasing technique.
Figure 3:
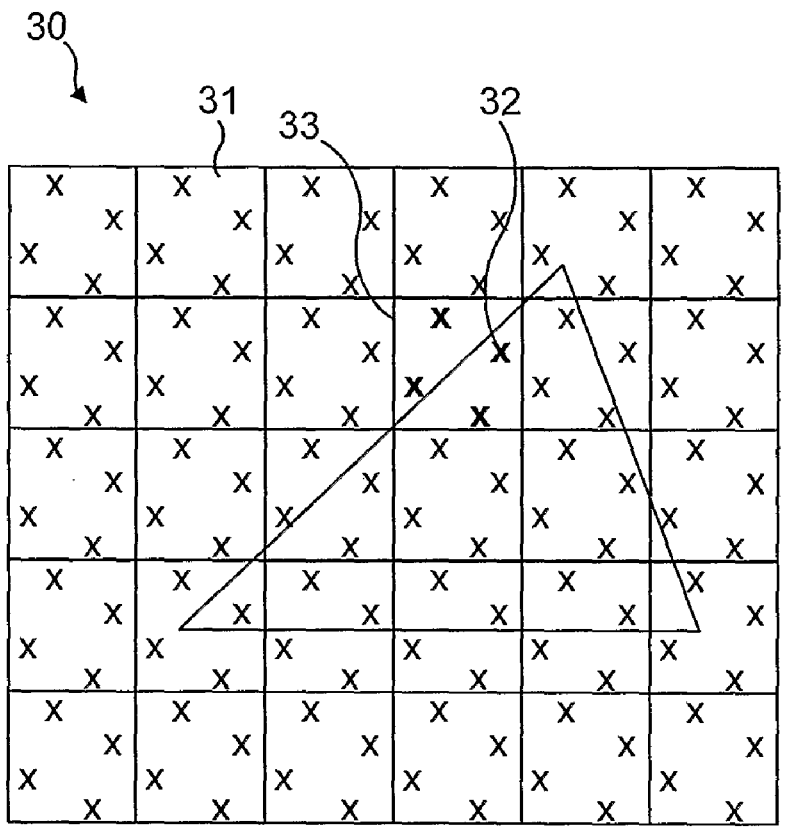
FIG. 3 shows schematically an image to be displayed.

FIG. 3 shows schematically the anti-aliasing arrangement that is used in the present embodiment. FIG. 3 shows schematically an array of pixels 30 that in the present embodiment represents a part of the image to be displayed (since, as will be discussed further below, the present embodiment is a tile-based rendering system) (although equally the set of pixels could be considered to represent the entire display of the image). Each pixel includes, as shown in FIG. 3, a set of four sampling points 31 that will be used to sample the image for the pixel in question and accordingly determine how the pixel is to be displayed on the final display.

Figure 4:
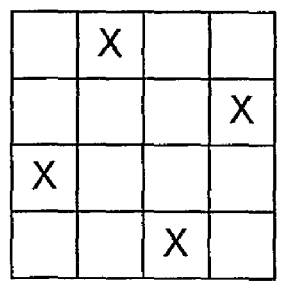
FIG. 4 shows an exemplary sampling pattern for use in an embodiment of the present invention.

As shown in FIG. 3, the same sampling pattern 31 is used for each pixel in the pixel array 30. In this embodiment, the sampling pattern is a rotated grid sampling pattern, although any other suitable anti-aliasing sampling pattern could be used if desired. FIG. 4 shows an expanded view of a single pixel showing the location of the sampling points in the sampling pattern within the pixel.

FIG. 3 also shows an image overlaid on the pixel array 30 in the form of a single primitive 32. (It will be appreciated here that the image has been shown in FIG. 3 as comprising a single primitive for simplicity, and in practice the image may and typically will comprise many, overlapping, primitives, as is known in the art.) As can be seen from FIG. 3, the primitive 32 overlies some of the pixels in the pixel array 30 completely, but only passes through part of some of the other pixels.

To process the primitive 32 of the image, the rendering system will, in essence, determine which of the sample points in each set of sample points of each pixel are covered by the primitive 32, and then render and store data for those covered sample points so that the image of the primitive 32 can be properly displayed on the display device.

The processing of the image of the primitive 32 for display in this manner in the present embodiment will now be described with reference to FIG. 5 which shows schematically an embodiment of a 3D graphics processing platform that can be operated in accordance with the present invention. The 3D graphics processing platform shown in FIG. 5 is a tile-based renderer, although as will be appreciated by those skilled in the art, other rendering arrangements can be used (and indeed, the present invention is equally applicable to two dimensional graphics processing as well).

Figure 5:
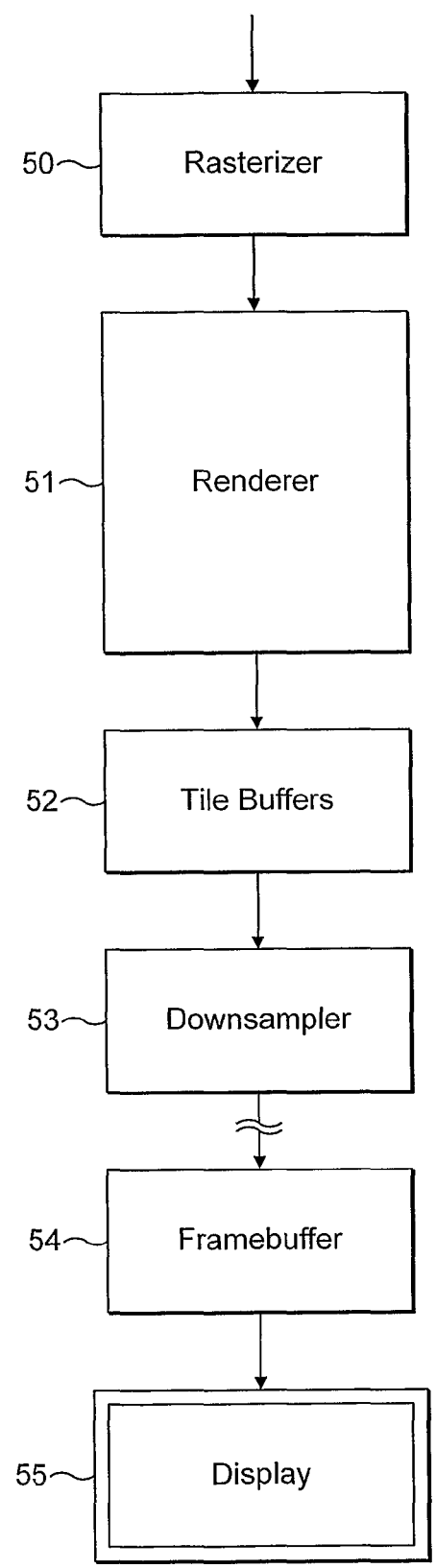
FIG. 5 shows an embodiment of a graphics processing platform that can be operated in accordance with the present invention.

The graphics processing platform shown in FIG. 5 includes a rasteriser 50 that receives graphics primitives for rendering and converts the primitive data to graphics fragments having appropriate positions for rendering the primitives.

There is then a renderer 51 in the form of a rendering pipeline that receives graphics fragments for rendering from the rasteriser 50 and applies a number of rendering operations, such as texture mapping, fogging, blending, etc., to those graphics fragments to generate the appropriate fragment data for display of the fragments. The rendered fragment data from the renderer 51 is stored in tile buffers 52 of the rendering pipeline for subsequent processing.

The tile buffers 52 store, as is known in the art, an array of fragment data that represents part of the image to be displayed. Once each tile has been processed, its data is exported to an appropriate storage, and the next tile is then processed, and so on, until sufficient tiles have been processed to display the entire image.

In the present embodiment, four tile buffers 52 are provided. Each tile buffer stores its fragment data in a 32×32 array (i.e. corresponding to a 32×32 array of sample positions in the image to be displayed). These tile buffers may be provided as separate buffers, or may in fact all be part of the same, larger buffer. They are located on (local to) the graphics processing platform (chip).

The data from the tile buffers 52 is input to a downsampling unit 53, and thence output to a frame buffer 54 (that may not be on the graphics processing platform itself) of a display device 55 for display on the display device 55, as is known in the art. The display device 55 could comprise, e.g., a display comprising an array of pixels, such as a computer monitor.

The downsampling unit 53 downsamples the fragment data stored in the tile buffers to the appropriate resolution for the display device 55 (i.e. such that an array of pixel data corresponding to the pixels of the display device is generated).

In the present embodiment, in accordance with the present invention the sampling points of the image have their own individual fragment data entries in the tile buffers 32. Thus, each 32×32 data position tile buffer will, for example, correspond to a 16×16 pixel array in the image to be displayed where 4× downsampling is used between the tile buffers and the display frame buffer (because in that case each pixel will effectively have four sampling points associated with it).

In this embodiment, two of the four tile buffers are used to store colour (red, green, blue) values for each sampling point (it would be possible to use one tile buffer for this purpose, but two are preferred), one tile buffer is used to store Z (depth)

values for each sampling point, and one is used to store stencil values for each sampling point. Other arrangements would, of course, be possible.

Although the sampling points each have their own individual fragment data entry in the tile buffers 52, in the present embodiment, again in accordance with the present invention, rather than rendering a separate fragment for each individual sample (data) position in the tile buffers 52 (i.e. for each individual sample point), one fragment is rendered for each set of four sample points corresponding to a given pixel in the image. In other words, a single fragment is used to render all four sample points of a set of sample points (and accordingly of a pixel in the image) together in one go, i.e. such that the sample points for a given pixel are all rendered in common. Then, once the fragment has been rendered, the rendered fragment data is stored in multiple copies in the appropriate sample positions in the tile buffers 52, so as to provide a separate set of fragment data for each individual sample position taken of the image.

Thus, in the present example, considering the image comprising the primitive 32 shown in FIG. 3, the rasteriser 50 will receive that primitive from the graphics processing system, and then determine which sets of sampling points of the image (i.e. in effect which pixels in the pixel array 30) include sampling points that are covered by the primitive 32. (This may be carried out in any appropriate manner known in the art.) The rasteriser 50 will then generate a fragment for each set of sampling points found to include a sampling point that is covered by the primitive 32. It will then pass those fragments to the renderer 51 for rendering.

Figure 7:
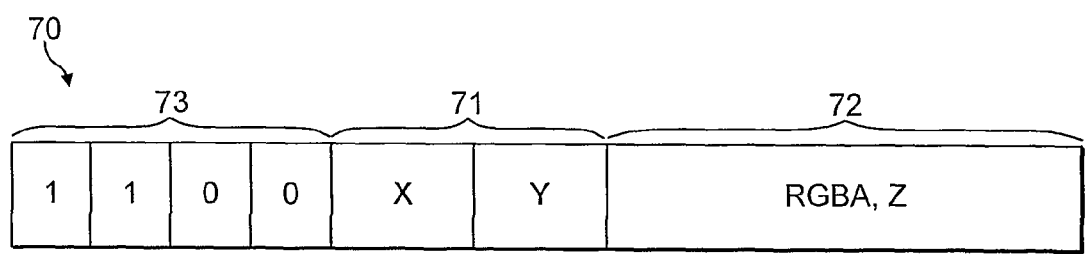
FIG. 7 illustrates the data that is associated with a fragment to be rendered in an embodiment of the present invention.

FIG. 7 shows schematically the data 70 that is generated for each fragment before it is rendered and that passes through the renderer 51. As shown in FIG. 7, the data that is associated with each fragment includes, inter alia, the x,y position 71 of the fragment (which represents the x,y position in the image of the set of sampling points that the fragment corresponds to (in practice in the present embodiment of the relevant pixel in the image)), together with the necessary per fragment data 72, such as the colour (RGB), transparency (alpha), depth (z) and stencil values for the fragment. This per fragment data 72 is, as is known in the art, used by and appropriately modified by rendering units of the renderer 51 to provide the output set of fragment data for the fragment that is then stored in the tile buffers 52.

The data 70 that is associated with the fragment also includes a coverage mask 73 that is in the form of a bit array representing each of the sample positions within the set of sample points that the fragment corresponds to. Each position in the bit array coverage mask 73 is set to "1" if the corresponding sample position is covered by the primitive in question, and to "0" if the sample position is not covered by the primitive in question. This allows the rendering process to know which of the sample points associated with a given fragment are in fact covered by the primitive 32 in question, so that the rendering process can ensure that the rendered fragment data for a fragment is only stored for the sample points that are covered by the primitive.

Figure 6:
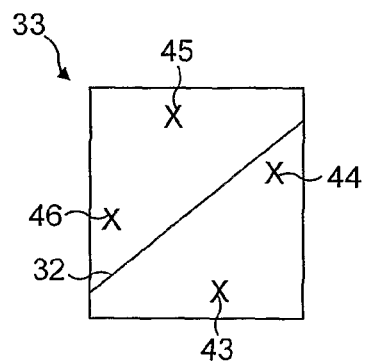
FIG. 6 shows an enlarged view of a pixel of FIG. 3.

This is necessary, because, as can be seen from FIG. 3, not all the sampling points of a set of sampling points for a pixel will necessarily be covered by a primitive. For example, as illustrated in FIG. 6, which shows an enlarged view of the set of sampling points for the pixel 33 in FIG. 3 in relation to a primitive 32 to be rendered, it can be seen that of the set of sampling points for the pixel 33, the sampling points 43 and 44 are covered by the primitive 32, but the sampling points 45 and 46 are not covered by that primitive. The rasteriser 50 will therefore generate a fragment for rendering for the set of sample positions for pixel 33, since that set of sample positions includes two sample positions, 43, 44, that are covered by the primitive 32. However, because the primitive 32 only covers the sample positions 43, 44, the rendered fragment data should only be stored in the tile buffer 52 for those sample positions and not for the samples positions 45 and 46.

Therefore, for the set of sample positions for the pixel 33 shown in FIG. 6, the rasteriser will generate a coverage mask 73 of the form "1100" (as shown in FIG. 7), to indicate that the sample positions 43 and 44 are being rendered by the fragment 70, but that the sample positions 45 and 46 are not being rendered by the fragment (since they are not covered by the primitive 32).

Thus, when the rasteriser 50 receives the primitive 32 for rendering, it will firstly determine which sets of sampling points (pixels) of the array 30 include sampling points that are covered by the primitive 32, and for each of those sets of sampling points generate a fragment having associated with it data of the form shown in FIG. 7.

Each fragment will then be passed in turn to the renderer 51 for rendering.

The renderer 51 will, as is known in the art, carry out rendering operations on the fragments that it receives. These rendering operations will, for example, include modifying the colour (RGB) and transparency (A) values of the fragments to provide final, rendered fragment data for each fragment. In the present embodiment, the renderer 51 includes a texture mapping stage that carries out a texture mapping process based on texture position data (s,t) that is associated with each fragment (this is not shown in FIG. 7).

In the present embodiment, the position within the image that the texture mapping process uses to determine the texture (colour) that will be applied to a fragment is selected in accordance with the locations (positions) in the image of the covered sampling points that the fragment is being used to render in common, i.e. a "weighted" texture sample position is used.

For example, if the sample coverage mask is "1111" (i.e. all sample points are covered), then the texture sample is taken from the centre of sample pattern (as that will be the best place to take it in those circumstances). Similarly, if the sample coverage mask is "1000", then the best place to take the texture sample would be at the position in the image corresponding to the single covered sampling point, and so on.

As in the present embodiment each fragment is associated with four possible sample positions (there are four bits in the sample coverage mask associated with each fragment), there are accordingly 16 preferred (weighted) texture sampling positions (corresponding to the 16 possible combinations of coverage masks that could be associated with each fragment).

These preferred texture sample positions are stored in a (16 entry) table in association with their respective corresponding sample coverage mask. The texture mapping stage then uses this table to look-up and determine where to take the texture sample for any given fragment on the basis of the coverage mask that is associated with the fragment.

Other texture sample position arrangements would, of course, be possible. For example, the position of the texture sample could be calculated in use, instead of being retrieved from a look-up table. This may be desirable and indeed necessary where, for example, more than four sampling points per fragment are possible.

Equally, a less sophisticated texture sampling process could be used, if desired. For example, all texture look-ups could simply be taken at the centre of the sampling pattern in question.

It will be appreciated here that because each fragment undergoes a single texture look-up, the set of sampling points that each fragment corresponds to undergo a single texture look-up in common (i.e. the texturing operation is used for all the sample points of the set of sampling points associated with the fragment), i.e. the set of sampling points is effectively processed in a multisampled manner.

Once the fragments have been rendered, their data needs to be stored appropriately in the tile buffers 52. In accordance with the present embodiment, the data for each rendered fragment is stored in the appropriate sample position(s) in the tile buffer array as indicated by the coverage mask 73 associated with each fragment. Thus, in the case of the fragment 70 exemplified in FIG. 7, for example, the rendered data for that fragment will be stored in two of the sample positions in the tile buffers 52, but not in the other two sample positions, that are associated with the fragment 70.

The fragment data that is stored in the tile buffers 52 comprises the colour (RGB), transparency (A), depth (Z) and stencil values for each sample position, as discussed above. This data can be stored in any suitable form.

As will be appreciated by those skilled in the art, the newly rendered fragment data that is to be stored in the tile buffers may and typically will need to be blended with data that is already stored in the tile buffers, as is known in the art. Thus, where a given fragment is being used to render more than one sample position in common (i.e. such that data from the fragment will be stored in plural sample positions in the tile buffers), then this blending operation should be carried out in an appropriate manner to achieve this, i.e. to blend the newly rendered fragment data appropriately into each appropriate sample position in the tile buffers. Thus, for example, the blending operation could, for example, be carried out in an appropriately "parallel" fashion, to blend the rendered fragment data into the plural, parallel, tile buffers.

Once this process has been completed for all the fragments relating to the primitive 32, it can then be repeated for subsequent primitives of the image (since, as discussed above, the image will typically be made up of plural primitives, and not just a single primitive 32). The process is repeated for all the primitives of the image, until the tile buffers 52 have the appropriate data stored in each of their sample positions.

The data stored in the tile buffers can then be exported to the downsampling unit 53 for downsampling and subsequent exporting to the frame buffer 54 for display, as is known in the art. This downsampling can take place in any suitable manner. In the present embodiment linear blending of the data is used to downsample it. However, other arrangements would be possible, it desired.

Where the image to be displayed comprises plural, overlapping primitives, it will also, as is known in the art, be necessary for the rendering process to determine whether in fact any given primitive will actually be seen at a given sampling point. In the present embodiment this is carried out, as is known in the art, by comparing depth (z) values for fragments as they are rendered. In particular, when a new fragment is to be rendered, the depth (z) value associated with that fragment is compared with the depth values of fragment data already stored for the sample positions in the tile buffers 52 that the fragment corresponds to, and if that comparison indicates that the new fragment will not be seen, the new fragment is not processed any further. On the other hand, if the comparison of the depth values indicates that in fact the new fragment will be seen in place of the currently stored fragment in the tile buffers 52, then the new fragment is rendered and its rendered fragment data stored in place of the existing data for the appropriate sample positions in the tile buffers 52.

In the present embodiment, the downsampling unit 53 is arranged such that it can selectively apply two different levels of downsampling to the data stored in the tile buffers 52.

In particular, the downsampling unit can firstly provide a four times downsampling operation, i.e. such that an array of four data entries (i.e. 2×2 sample positions) stored in the tile buffers 52 would be downsampled to a single output data value for the frame buffer 54. This arrangement would be the normal mode of operation for the downsampling unit 53, since it would take four sample values and downsample them to a single value, corresponding to the four samples that are taken for each pixel in the image as shown in FIG. 3. In this arrangement, the 32×32 array tile buffers 52 would be downsampled to (and correspond to) a 16×16 pixel array in the frame buffer 54.

However, the downsampling unit 53 can also selectively apply an additional 4× downsampling operation, which would therefore effectively provide a 16× downsampling arrangement for the position samples of the image (i.e. such that an array of 8×8 sample positions in the tile buffers 52 would be combined to a single value for the frame buffer 54). The effect of this is that there may be effectively 16× position (edge) sampling (since 16 sampled positions in the original image shown in FIG. 3 would be downsampled to a single value), together with 4× texture (colour) sampling (since, as discussed above, in the present embodiment a single texture sample is taken for every four position samples (i.e. each set of four sampling points)).

Figure 8:
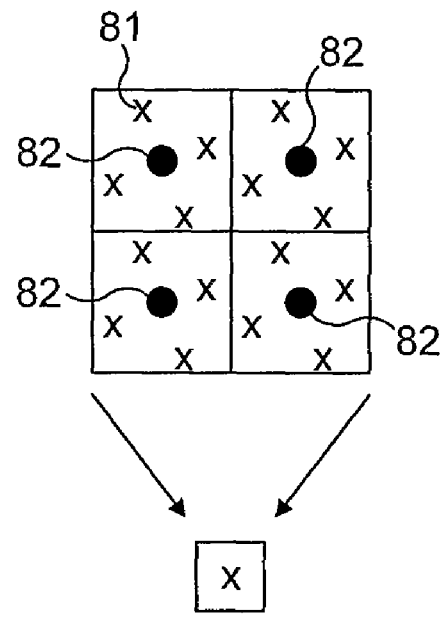
FIGS. 8 and 9 show exemplary sampling arrangements for use in an embodiment of the present invention.

FIG. 8 illustrates this, and shows four sets of four sampling points 81 each that would in the 16× arrangement be downsampled to a single value for output. FIG. 8 also shows the location of the four colour (texture) samples 82 that would be taken and also downsampled to a single colour value as part of the process.

In this arrangement, the 32×32 array tile buffers would be downsampled to (and correspond to) an 8×8 pixel array in the frame buffer 54.

In the present embodiment, the level of downsampling is set on a per frame basis, and is stored in an appropriate register that the rendering process can look up when it receives a frame for rendering.

The arrangement shown in FIG. 8 uses the same sampling pattern for the position samples 81 and the same positions for the colour samples 82 in each individual set of those samples. This means that the downsampling operation is effectively an ordered grid arrangement, since some of the samples will have the same x or y coordinates in the image. As is known in the art, this will reduce the effective level of downsampling that is carried out.

Figure 9:
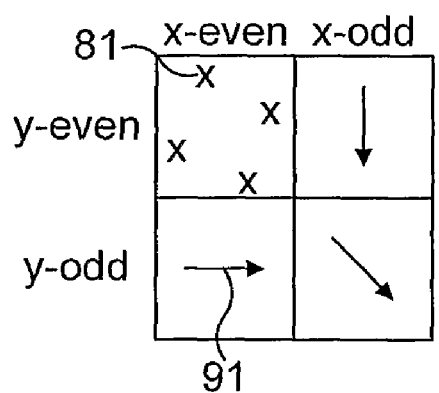

It is therefore preferred in this arrangement for the position and colour sampling positions in each of the four sets of samples that will be combined to make the final output value to be varied slightly relative to each other as between their x,y coordinates, so as to ensure that in practice sixteen unique position samples and four unique colour samples are taken. This is preferably achieved by shifting slightly the positions of each sample for the four sets of samples that will ultimately be downsampled to the final output data values. This is preferably done by setting a base set of sample positions for all of the sets of sample positions and then for three of the sample sets shifting the positions of that base set relatively by a given amount in a different direction for each set. FIG. 9 illustrates this in respect of the set of position samples 81. The arrows 91 in FIG. 9 show the direction of relative shift of the sample positions for each of the different sets of samples (pixels in the present embodiment) that will ultimately be combined when the data is 16× downsampled.

Such an arrangement will ensure that each sample that is used will have unique x and y coordinates. (This type of arrangement is preferably only enabled when the additional level of downsampling (i.e. to 16× downsampling) is enabled in the downsampling unit 53.)

The downsampling unit 53 also applies appropriate gamma correction to the data that it outputs to the frame buffer 54.

Although the operation of the above embodiment has been described in the context of using a single fragment to render each set of sampling points, in a preferred embodiment, it is possible for the rasteriser and rendering process to generate and render plural fragments for rendering for each set of sampling points, if desired. In particular, it is preferably possible to arrange the rendering process to generate plural fragments for rendering where the primitive covers more than one sampling point in the set of sampling points that a given fragment corresponds to.

Thus, in another preferred embodiment, the rasteriser determines whether the primitive covers more than one sampling point in a set of sampling points for a fragment, and if it does, can (and preferably does) generate a (separate) fragment for rendering for each sampling point in the set of sampling points that is covered by the primitive. The fragments that are generated are preferably then associated with different sampling points in the set of sampling points (by setting their coverage masks 73 appropriately), so that a different fragment will be used, for example, to render each covered sampling point.

This has the effect of generating additional texture look-ups (colour samples) for the sampling points that are covered by the primitive, i.e. such that, in effect, rather than a single colour sample being used to render the covered sampling points of the set of sampling points in common, more than one colour sample will be used (since more than one fragment will be rendered for the set of sampling points). This will allow the rendering process to operate more in a supersampled manner.

Figure 10:
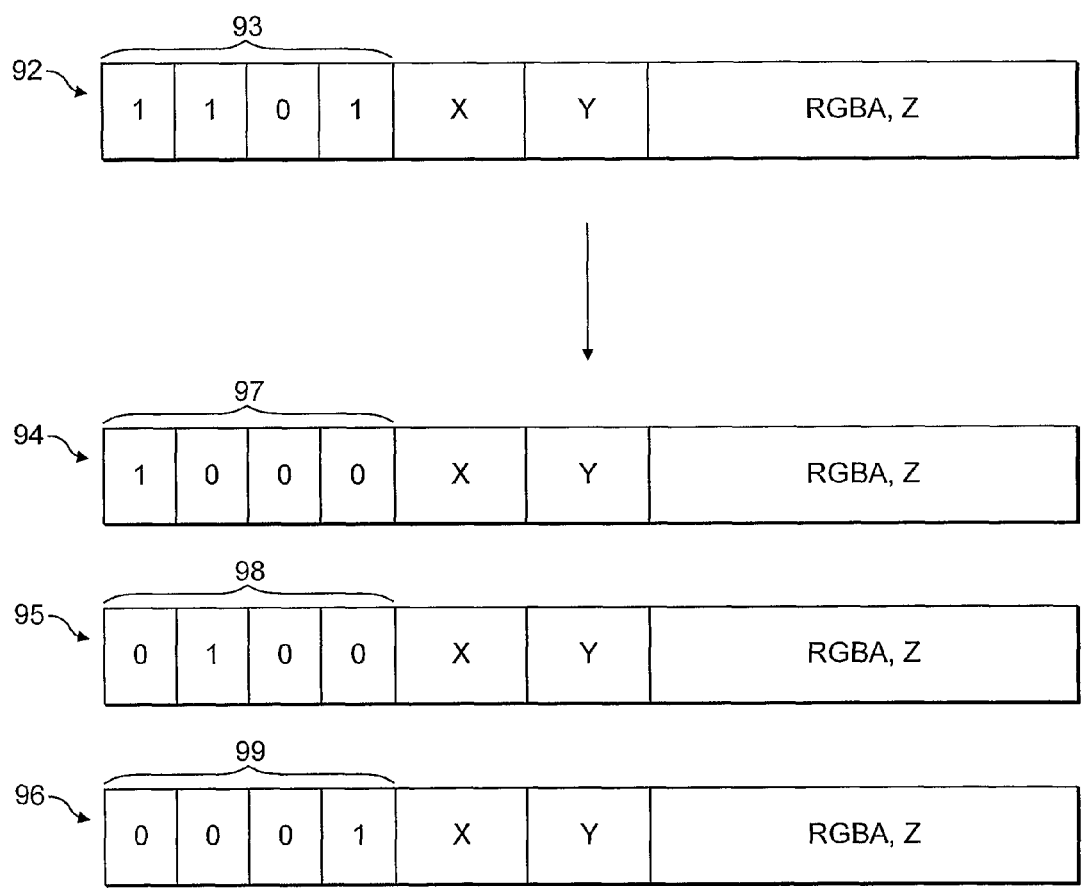
FIG. 10 shows schematically the generation of graphics fragments in an embodiment of the present invention.

FIG. 10 illustrates this process. In FIG. 10, there is shown an exemplary fragment 92 that has been generated and for which it has been determined that three sampling points of the set of four sampling points that the fragment corresponds to are covered by the primitive in question. Thus the coverage mask 93 for the fragment 92 has the form "1101" as shown in FIG. 10.

In accordance with this embodiment of the invention, the system then proceeds to generate three fragments 94, 95, 96 that correspond to the fragment 92 (since three of the sampling points that the fragment 92 corresponds to are covered by the primitive), as shown in FIG. 10, with each such fragment having the same basic fragment data (i.e. at least initial colour (red, green, blue) and depth (z) data) as the fragment 92, but with the coverage masks 97, 98 and 99 of the respective fragments set such that each fragment is effectively indicated as corresponding to a single covered sampling point only. The three fragments 94, 95 and 96 will then each be rendered in turn, and their rendered data stored for the sampling position to which each fragment corresponds as indicated by its coverage mask.

In this way, rather than the single fragment 92 being used to render all three sampling points covered by the primitive, three different fragments are used to render those sampling points and so three different sets of rendered fragment data will be stored for the three sampling points in the tile buffers 52. The rendering process can therefore be thought of as effectively being supersampled.

This arrangement therefore allows the rendering process to be operated more in a supersampled manner, but does not, for example, require any knowledge of this operation by the driver or application software that is controlling the graphics processor, since the change to the rendering arrangement is carried out by the graphics processor itself.

Such "supersampling" operation may be particularly useful for graphics for so-called alpha textures, as is known in the art.

Figure 11:
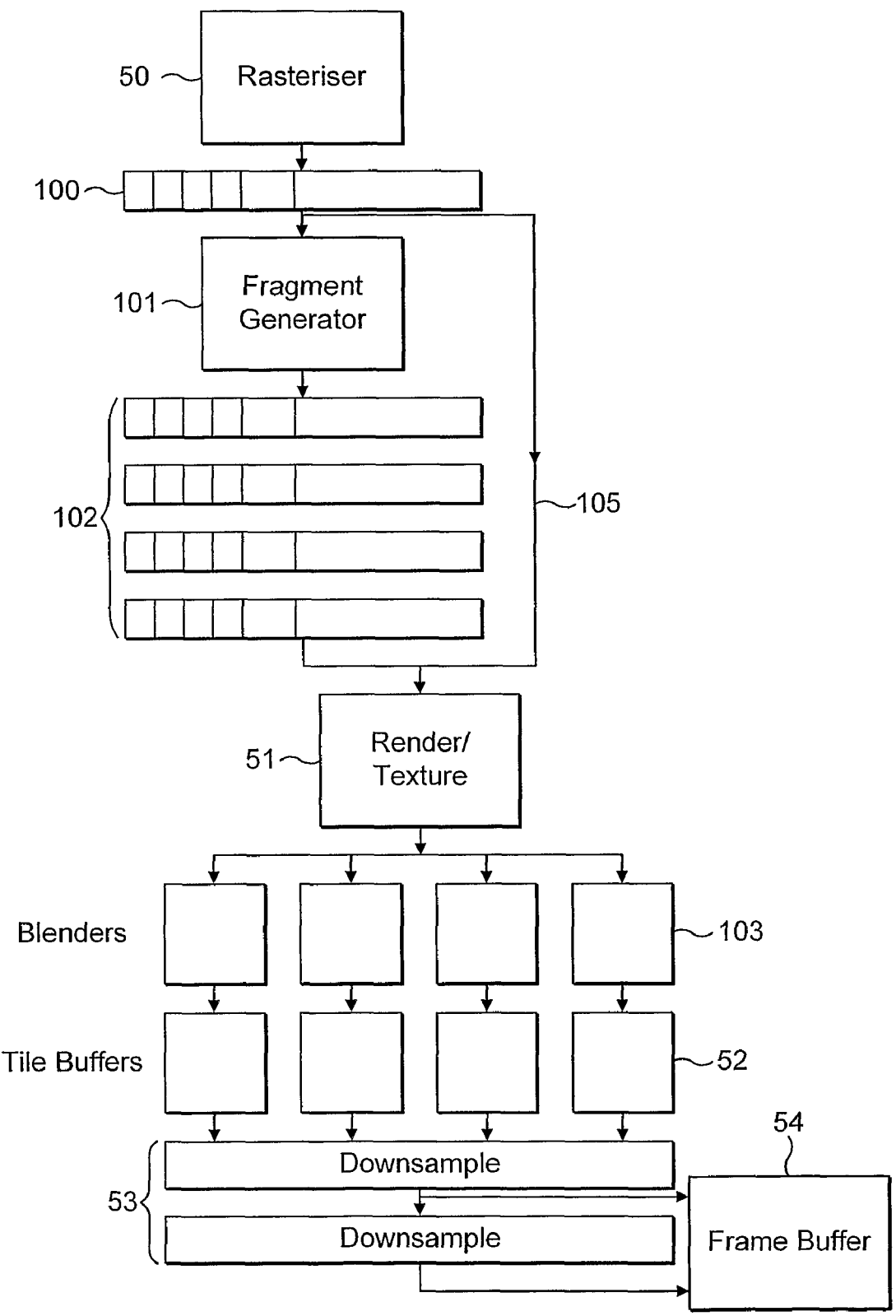
FIG. 11 shows an expanded, schematic view of part of a graphics processing platform that can be operated in accordance with the present invention.

FIG. 11 shows schematically an arrangement for a graphics processing platform that can operate in accordance with the above embodiment. As can be seen from FIG. 11, the graphics processing platform shown in FIG. 11 is of a similar structure and has similar components to the graphics processing platform shown in FIG. 5, and accordingly like reference numerals have been used for like components. Equally, the graphics processing platform of FIG. 11 operates, unless stated otherwise, in a similar manner to the graphics processing platform described above in relation to FIG. 5 and the remaining Figures of the present application.

Thus, the graphics processing platform shown in FIG. 11 includes a rasteriser 50 that generates fragments 100 for each set of sampling points of the image found to include a sampling point that is covered by the primitive in question. However, as shown in FIG. 11, there is then an additional fragment generator stage 101 that when activated will generate plural fragments 102 for sets of sampling points found to include more than one sampling point that is covered by a given primitive, in the manner discussed above.

It should be noted here that as shown by path 105 in FIG. 11, the fragment generator stage 101 can be bypassed if desired (i.e. such that the set of sampling points will be rendered using the single fragment 100). Such bypassing of the fragments generator stage 101 can preferably be selectively activated and set (or not), in use, preferably on a per fragment, per primitive, per tile and/or per scene basis, or for any desired combination of these, as desired. This allows the fragment generator stage 101 to be selectively activated in use (and thus the renderer to be able to be configurable to operate to produce plural fragments for a given set of sampling points or not), for example for a given primitive, or fragment, etc.

If the fragment generator 101 is being bypassed, then the fragment 100 is simply sent straight to a rendering and texture unit 51 for rendering, as shown by the path 105 in FIG. 11.

Whether the fragment generator 101 is to be bypassed or not is preferably set as part of the rendering state for a scene and/or primitive, although other arrangements would, of course, be possible.

Where the fragment generator 101 is not to be bypassed, but is activated (i.e. included in the rendering process (pipeline)) then it will take as its input the fragment 100 generated by the rasteriser 50. The fragment generator 101 will then analyse the coverage mask associated with the fragment 100, to determine how many covered sampling points the fragment 100 corresponds to.

If the fragment generator 101 determines that the fragment 100 corresponds to a single covered sampling point only, it simply passes the fragment 100 to the rest of the rendering unit 51 for rendering in an unchanged form (i.e. without carrying out any processing, etc., of the fragment 100), since the single fragment 100 will suffice to render the single covered sampling point that the fragment 100 corresponds to. (It would, alternatively, be possible, e.g., for the fragment generator 101 to in effect, generate a duplicate copy of the fragment 100 and send that copy for rendering, if desired.)

On the other hand, if the fragment generator 101 determines that the fragment 100 corresponds to more than one covered sampling point (i.e., the information, namely the coverage mask, associated with the fragment 100 indicates that the fragment 100 is being used to render more than one sample position in common), then the fragment generator 101 generates a new set of fragments 102 in the manner described above with reference to FIG. 10, to provide one new fragment for rendering for each (and corresponding to each) covered sampling point that the fragment 100 corresponded to. In other words, a new set of fragments 102, comprising one fragment for each covered sampling point, is generated by the fragment generator 101 and sent for rendering.

As discussed above in relation to FIG. 10, the fragments in the set of new fragments 102 each have the same basic fragment data as the fragment 100, but each have a new (and different) coverage mask, indicating the individual sampling position that the respective fragment is being rendered for.

FIG. 11 shows a new set of fragments 102 comprising four fragments generated by the fragment generator 101. This would be the case where the fragment 100 corresponds to four covered sampling positions. If the fragment 100 corresponded to three covered sampling points only, fragment generator 101 would generate a new set 102 of three fragments (one for each covered sampling position), and so on.

The fragment or fragments issued by the fragment generator 101 (i.e. either the single fragment 100 generated by the rasteriser 50, or the plural fragments 102 generated by the fragment generator 101) are passed by the fragment generator 101 for rendering to the rendering and texture unit 51, as before (and as is the case, as discussed above, when the fragment generator 101 is not being used and is bypassed) and as is known in the art.

Once the fragments have been processed by the rendering and texture unit 51, the rendered fragment data is stored in four parallel tile buffers 52, as before. In this regard, FIG. 11 shows explicitly the blending stage 103 of the rendering process, which, in this embodiment, is carried out by using four blenders 103 in parallel, one blender corresponding to each of the tile buffers 52. In this case, the data for a rendered fragment leaving the rendering and texturing unit 51 is sent as appropriate to the blender or blenders 103 that correspond to the tile buffer or buffers 52 where that data is to be stored. Other arrangements would, of course, be possible.

The data stored in the tile buffers 52 is then, again as before, downsampled by downsampling unit 53 and passed to a frame buffer 54 for display. In FIG. 11, the downsampling unit 53 is shown as including two stages, as discussed above, with the data capable of being output either after the first downsampling stage or after the second downsampling stage (i.e. such that two downsampling operations would be carried out, as discussed above).

Other variations to the operation of the rendering process of the present invention and of the preferred embodiments of the present invention are possible. For example, the number of sample points in each set of sampling points could be varied. In particular, it would be possible to set the sets of sampling points such that they comprise a single sampling point only. In that case, each fragment would effectively be used to render a single pixel in the image, i.e. such that there was effectively no anti-aliasing being carried out. (In this case, the coverage mask for the fragment would, e.g., be set to "1111" (i.e. such that all samples are "covered" and the, e.g., texture look-up is made at a single sample point, in the middle of the sampling pattern (e.g. pixel), as discussed above). The rendered fragment data would then be stored in all four sampling positions in the tile buffers 52 that correspond to the coverage mask sample positions (e.g. for the pixel that the fragment corresponds to), so that when the data stored for those sample positions are downsampled by the downsampling unit 53, the same data value is output.)

In a preferred embodiment, the above possible alternative operations of the rendering process, for example whether it operates in a multisampled, supersampled or non-anti-aliased manner, is set as part of the rendering state that is set for each primitive as it is rendered. (As is known in the art, the rendering state for a given primitive effectively provides information to configure the rendering process to the appropriate set-up for rendering the primitive in question. Thus the anti-aliasing mode to be used can conveniently be set as part of the rendering state for a primitive, in a similar manner to the remaining rendering state conditions.)

It can be seen from the above that the present invention, in its preferred embodiments at least, provides a rendering arrangement in which the rendering of each fragment can effectively process plural position samples of the image in parallel, but the rendered fragment data is stored such that a separate colour value is stored per sample position.

Furthermore, the arrangement can also be operated to use a number of different anti-aliasing techniques in the same frame, for example on a per primitive basis. In particular, primitives can effectively be selectively effectively supersampled or multisampled, and the amount of downsampling can also be selected in use. Thus the present invention provides a particularly flexible rendering and anti-aliasing arrangement that can be tailored to the specific requirements of any given image or part of an image.

The present invention, in its preferred embodiments at least, can offer both 4× and 16× full scene anti-aliasing. Furthermore, 4× full scene anti-aliasing can be carried out without any performance, power or bandwidth penalties. This makes the processor of the present invention particularly suitable for use in portable and handheld devices, such as mobile phones or personal digital assistants (PDAs).

The invention claimed is:

1. A method of processing graphics primitives of an image to be displayed, said method is carried out on a graphics processor, the method comprising:
determining for each sampling point of a plurality of sets of sampling points of the image to be displayed whether a graphics primitive covers the sampling point;
generating a set of graphics fragments for rendering the primitive, each graphics fragment corresponding to a set of sampling points found to include a sampling point that is covered by the primitive;
rendering some or all of the graphics fragments generated for the primitive to determine a set of fragment data for each rendered graphics fragment; and
storing in an array of fragment data a separate set of rendered fragment data for each sampling point of the sets of sampling points that correspond to the rendered graphics fragments found to be covered by the primitive, wherein said step of generating comprises selectively generating at least one graphics fragment for rendering for a set of sampling points found to include a sampling point covered by said primitive.

2. The method of claim 1, wherein each set of sampling points includes plural sampling points.

3. The method of claim 1, comprising grouping the fragments into sets of plural fragments, and using a different sampling pattern for each fragment in each set of plural fragments, but using the same sampling pattern for the corresponding fragment of each set of fragments.

4. The method of claim 1, comprising generating and rendering a single fragment only for a set of sampling points.

5. The method of claim 1, comprising generating and rendering more than one fragment for a set of sampling points.

6. The method of claim 1, comprising generating and rendering a separate fragment for each sampling point of a or of each set of sampling points that is covered by a primitive.

7. The method of claim 1, comprising selectively generating plural fragments for a set of sampling points on the basis of the number of sampling points in the set of sampling points that are determined to be covered by a primitive.

8. The method of claim 1, comprising configuring the arrangement either to only generate a single graphics fragment only for rendering for a set of sampling points that is to be rendered, or to be able to generate plural graphics fragments for rendering for a set of sampling points that is to be rendered on at least one of a per fragment, per primitive, per drawing call, per tile and per scene basis.

9. The method of claim 1, comprising:
generating a single fragment for a set of sampling points found to include a sampling point that is covered by a primitive;
determining whether the set of sampling points includes more than one sampling point covered by the primitive; and,
if it does, generating a set of plural fragments for rendering for the set of sampling points.

10. The method of claim 9, comprising selectively bypassing the steps of determining whether the set of sampling points includes more than one sampling point covered by the primitive, and, if it does, generating a set of plural fragments for rendering for the set of sampling points.

11. The method of claim 9, wherein the plural graphics fragments generated for a set of sampling points found to include more than one sampling point that is covered by the primitive have at least some fragment data in common with the graphics fragment initially generated for the set of sampling points.

12. The method of claim 1, comprising associating with each graphics fragment data indicating which of the sampling points in the set of sampling points that the fragment corresponds to, the rendered fragment data should be stored for in the fragment data array.

13. The method of claim 1, comprising associating with, or providing as part of, the fragment data for each fragment that is rendered, a coverage mask that indicates, for each sample position of the set of sample positions that is associated with the fragment, whether the fragment is being used to render that sample point.

14. The method of claim 1, comprising sampling the colour for a fragment as the fragment is rendered.

15. The method of claim 14, comprising determining the colour sample's position in accordance with the covered sampling points that the fragment is being used to render.

16. The method of claim 1, further comprising downsampling the stored fragment data to provide an output set of data values for a pixel array of a display.

17. The method of claim 16, wherein the level of downsampling applied to the fragment data can be selected in use.

18. The method of claim 16, wherein the downsampling of the stored fragment data to pixel data is performed on a graphics processing platform prior to that data being exported to a frame buffer for the display device.

19. The method of claim 1, comprising:
associating each fragment to be rendered with a sampling and/or anti-aliasing mode to be used for rendering the fragment; and
a rendering unit, when it receives a fragment to be rendered, determining the sampling and/or anti-aliasing mode associated with that fragment, being configured in accordance with the determined sampling and/or anti-aliasing mode, and carrying out its rendering operation on the received fragment.

20. A computer program product stored on a non-transitory computer readable storage medium including computer software code portions for performing the method of claim 1 when the program element is run on data processing means.

21. The method of claim 1, comprising the step of selectively generating plural fragments for a set of sampling points on at least one of a per fragment, per primitive, per drawing call, per tile and per scene basis.

22. An apparatus for processing graphics primitives of an image to be displayed, the apparatus comprising:
a processor for determining for each sampling point of a plurality of sets of sampling points of the image to be displayed whether a graphics primitive covers the sampling point;
a processor for generating a set of graphics fragments for rendering the primitive, each graphics fragment corresponding to a set of sampling points found to include a sampling point that is covered by the primitive;
a processor for rendering graphics fragments generated for the primitive to determine a set of fragment data for each rendered graphics fragment; and
a processor for storing in an array of fragment data a separate set of rendered fragment data for each sampling point of the sets of sampling points that correspond to the rendered graphics fragments found to be covered by the primitive, wherein said processor for generating generates at least one graphics fragment for rendering for a set of sampling points found to include a sampling point that is covered by said primitive.

23. The apparatus of claim 22, comprising a processor for generating and rendering a single fragment only for a set of sampling points.

24. The apparatus of claim 22, comprising a processor for generating and rendering more than one fragment for a set of sampling points.

25. The apparatus of claim 22, comprising a processor for generating and rendering a separate fragment for each sampling point of a or of each set of sampling points that is covered by a primitive.

26. The apparatus of claim 22, wherein the processor for selectively generating plural fragments for a set of sampling points comprises a processor for selectively generating plural fragments for a set of sampling points on the basis of the number of sampling positions in the set of sampling points that are determined to be covered by a primitive.

27. The apparatus of claim 22, comprising a processor for configuring the apparatus either to only generate a single graphics fragment only for rendering for a set of sampling points that is to be rendered, or to be able to generate plural graphics fragments for rendering for a set of sampling points that is to be rendered on at least one of a per fragment, per primitive, per drawing call, per tile and per scene basis.

28. The apparatus of claim 22, comprising:
a processor for generating a single fragment for a set of sampling points found to include a sampling point that is covered by a primitive; and
a processor for determining whether the set of sampling points includes more than one sampling point covered by the primitive, and for, if it does, generating a set of plural fragments for rendering for the set of sampling points.

29. The apparatus of claim 28, comprising a processor for selectively bypassing the processor for determining whether the set of sampling points includes more than one sampling point covered by the primitive, and for, if it does, generating a set of plural fragments for rendering for the set of sampling points.

30. The apparatus of claim 28, wherein the plural graphics fragments generated for a set of sampling points found to include more than one sampling point that is covered by the primitive have at least some fragment data in common with the graphics fragment initially generated for the set of sampling points.

31. The apparatus of claim 22, comprising a processor for associating with each graphics fragment data indicating which of the sampling points in the set of sampling points that the fragment corresponds to, the rendered fragment data should be stored for in the fragment data array.

32. The apparatus of claim 22, comprising a processor for sampling the colour for a fragment as the fragment is rendered.

33. The apparatus of claim 32, comprising a processor for determining the colour sample's position in accordance with the covered sampling points that the fragment is being used to render.

34. The apparatus of claim 22, further comprising a processor for downsampling the stored fragment data to provide an output set of data values for a pixel array of a display.

35. The apparatus of claim 34, comprising a processor for selecting the level of downsampling applied to the fragment data.

36. The apparatus of claim 34, comprising means for exporting the downsampled fragment data to a frame buffer for display.

37. The apparatus of claim 22, comprising:
a processor for associating each fragment to be rendered with a sampling and/or anti-aliasing mode to be used for rendering the fragment; and
a rendering unit or units comprising a processor for, when it receives a fragment to be rendered, determining the sampling and/or anti-aliasing mode associated with that fragment, and a processor for configuring the rendering unit in accordance with the determined sampling and/or anti-aliasing mode, and a processor for carrying out a rendering operation on the received fragment.

38. The apparatus of claim 22, wherein said processor for generating generates at least one fragment for a set of sampling points on at least one of a per fragment, per primitive, per drawing call, per tile and per scene basis.

* * * * *